(12) United States Patent
Shiroishi

(10) Patent No.: US 12,128,945 B2
(45) Date of Patent: Oct. 29, 2024

(54) STEERING DEVICE

(71) Applicant: YAMADA MANUFACTURING CO., LTD., Kiryu (JP)

(72) Inventor: Yoshinori Shiroishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 18/186,583

(22) Filed: Mar. 20, 2023

(65) Prior Publication Data

US 2023/0303151 A1    Sep. 28, 2023

(30) Foreign Application Priority Data

Mar. 24, 2022    (JP) .................................. 2022-048192

(51) Int. Cl.
*B62D 1/184*  (2006.01)
*B62D 1/187*  (2006.01)

(52) U.S. Cl.
CPC ............. *B62D 1/184* (2013.01); *B62D 1/187* (2013.01)

(58) Field of Classification Search
CPC ................................ B62D 1/184; B62D 1/187
See application file for complete search history.

(56) References Cited

U.S. PATENT DOCUMENTS

| 7,717,011 B2* | 5/2010 | Hirooka | B62D 1/184 |
| | | | 74/493 |
| 9,120,502 B2* | 9/2015 | Mihara | F16H 25/186 |
| 9,783,222 B2* | 10/2017 | Tomiyama | B62D 1/184 |
| 9,969,420 B2* | 5/2018 | Ishii | B62D 1/184 |
| 10,279,833 B2* | 5/2019 | Hagiwara | B62D 1/187 |
| 2002/0023515 A1* | 2/2002 | Kuroumaru | B62D 1/184 |
| | | | 74/493 |

(Continued)

FOREIGN PATENT DOCUMENTS

| CN | 1833940 A | * | 9/2006 | ............. B62D 1/184 |
| JP | 2006256585 A | * | 9/2006 | ............. B62D 1/184 |
| JP | 2013-129411 A |  | 7/2013 | |

(Continued)

*Primary Examiner* — Drew J Brown
(74) *Attorney, Agent, or Firm* — Rankin, Hill & Clark LLP

(57) ABSTRACT

In a steering device according to an aspect of the present disclosure, a lock mechanism includes a rod, a drive cam, and a driven cam. The lock mechanism causes paired side plate portions to approach each other in a right-left direction with a drive base and a driven base being separated from each other in the right-left direction as a cam portion slides on a cam follower portion toward a first side in a circumferential direction and causes the paired side plate portions to be separated from each other in the right-left direction with the drive base and the driven base approaching from each other in the right-left direction as the cam portion slides on the cam follower portion toward a second side in the circumferential direction. A first portion from among the cam portion and the cam follower portion includes a first top portion that comes into contact with a second portion from among the cam portion and the cam follower portion, and a first clearance portion that extends to become farther from the second portion in the right-left direction from the first top portion toward an outer side in a radial direction intersecting a second axis.

10 Claims, 15 Drawing Sheets

(56) References Cited

U.S. PATENT DOCUMENTS

2013/0247708 A1* 9/2013 Hirooka ................. B62D 1/184
74/493
2022/0234646 A1* 7/2022 Yokokura .............. B62D 1/187

FOREIGN PATENT DOCUMENTS

WO    WO-2014084262 A1 * 6/2014 ............. B62D 1/184
WO    WO-2019189474 A1 * 10/2019 ............... B62D 1/18

* cited by examiner

STEERING DEVICE

BACKGROUND OF THE INVENTION

Field of the Invention

The present disclosure relates to a steering device.

Priority is claimed on Japanese Patent Application No. 2022-048192, filed on Mar. 24, 2022, the content of which is incorporated herein by reference.

Description of Related Art

In some cases, a steering device has a tilt function of adjusting the vertical position of a steering shaft in accordance with a difference in body size between drivers or a driving posture. In the steering device, the steering shaft is held by a column unit so as to be rotatable around an axis extending along a front-rear direction. A front end portion of the column unit is supported by a front bracket so as to be rotatable around an axis extending along a right-left direction. A rear end portion of the column unit is supported by a rear bracket via a rod. A tilt guide hole that extends in a vertical direction is formed in the rear bracket. The rod is inserted into the tilt guide hole through a through-hole of the column unit. In the case of the steering device, the vertical position of the column unit (a steering shaft) changes with the rod moving upward or downward in the tilt guide hole due to rotation with respect to the front bracket.

A lock mechanism, which switches between a locked state in which rotation of the column unit with respect to the front bracket is restricted and an unlocked state in which the rotation of the column unit with respect to the front bracket is allowed, is installed in the steering device having the tilt function. For example, the lock mechanism includes a drive cam fixed to a rod and a driven cam held by a rear bracket.

In the case of the lock mechanism, as the rod rotates, a cam portion of the drive cam and a cam follower portion of the driven cam slide on each other such that the distance between the drive cam and the driven cam is increased or decreased. At this time, when the distance between the drive cam and the driven cam is increased, the column unit is fastened by the rear bracket, so that the above-described locked state is achieved. Meanwhile, when the distance between the drive cam and the driven cam is decreased, the column unit fastened by the rear bracket is loosened, so that the above-described unlocked state is achieved.

Disclosed in Japanese Unexamined Patent Application, First Publication No. 2013-129411 is a configuration in which the radius of curvature of a cam portion decreases toward an inner side in a radial direction of a drive cam. According to this configuration, it is possible to reduce the operation torque of a rod by bringing a point of contact between the cam portion and a cam follower portion close to the center of rotation of the rod.

In the case of the lock mechanism, a component force along a rotation direction of the drive cam, which is a portion of a load acting in a normal direction of the cam portion between the drive cam and the driven cam, acts as a frictional force (a resistance force) generated at the time of relative rotation of the drive cam and the driven cam. Meanwhile, a component force along a right-left direction, which is a portion of the load acting in the normal direction of the cam portion, acts as an axial force that presses the rear bracket in the right-left direction via the cam follower portion. The axial force functions as a fastening force that fastens the column unit via the rear bracket in the locked state.

However, in a case where the radius of curvature of the cam portion is made small as in the above-described related art, the component force along the rotation direction of the drive cam is likely to be made large and the component force along the right-left direction is likely to be made small, the component forces being portions of the load acting in the normal direction of the cam portion. Therefore, in the related art, there is a probability that the frictional force between the drive cam and the driven cam is made large and thus a desired fastening force cannot be obtained. In a case where there is a dimensional error caused by manufacturing variability or the like, there is a probability that the cam portion and the cam follower portion cannot be brought into contact with each other at a desired position. Accordingly, there is a probability that not only a desired fastening force cannot be secured but also desired operation torque cannot be obtained.

SUMMARY OF THE INVENTION

The present disclosure provides a steering device with which it is possible to secure a desired fastening force while reducing operation torque.

In order to solve the above-described problems, aspects as follows have been adopted in the present disclosure.

(1) A steering device according to an aspect of the present disclosure includes: a column unit configured to support a steering shaft such that the steering shaft is rotatable around a first axis extending along a front-rear direction; a bracket configured to support the column unit to be movable upward and downward along tilt guide holes and including a pair of side plate portions in which the tilt guide holes extending in a vertical direction are formed, the side plate portions being provided on both sides with respect to the column unit in a right-left direction; and a lock mechanism configured to switch between a locked state in which the paired side plate portions are caused to approach each other in the right-left direction so that the column unit is restricted from moving upward and downward with respect to the bracket and an unlocked state in which the paired side plate portions are separated from each other in the right-left direction so that the column unit is allowed to move upward and downward with respect to the bracket. The lock mechanism includes a rod that penetrates the column unit and the tilt guide holes in the right-left direction and that is supported by the column unit so as to be rotatable in a circumferential direction around a second axis extending along the right-left direction, a drive cam that includes a drive base and a cam portion bulging in the right-left direction from the drive base and that integrally rotates with the rod, and a driven cam that includes a driven base and a cam follower portion bulging in the right-left direction from the driven base and sliding on the cam portion as the rod rotates. The lock mechanism causes the paired side plate portions to approach each other in the right-left direction with the drive base and the driven base being separated from each other in the right-left direction as the cam portion slides on the cam follower portion toward a first side in the circumferential direction and causes the paired side plate portions to be separated from each other in the right-left direction with the drive base and the driven base approaching from each other in the right-left direction as the cam portion slides on the cam follower portion toward a second side in the circumferential direction. A first portion from among the cam portion and the cam follower portion includes a first top portion that comes into contact with a second portion from among the cam portion and the cam follower portion, and a first clearance portion that extends to become farther from the second portion in the right-left direction from the first top portion toward an outer side in a radial direction intersecting the second axis.

According to the aspect, top portions positioned at inner peripheral portions can slide on each other in a state where clearance portions positioned at outer peripheral portions are separated from each other when the drive cam and the driven cam rotate relative to each other. Accordingly, it is possible to set the position of contact with the second portion on the first portion to a position on an inner side in the radial direction and thus it is possible to reduce torque around the second axis at the time of rotation of the rod. Accordingly, it is possible to reduce operation torque at the time of rotation of the rod and thus excellent operability can be exhibited. It is possible to set a relatively large radius of curvature for the first portion in comparison with a configuration in which the radius of curvature of the first portion is made small for the purpose of setting the position of contact with the second portion on the first portion to a position on the inner side in the radial direction. Accordingly, a small component force along a rotation direction of the drive cam, which is a portion of a load along a normal direction of the first portion that acts between the cam portion and the cam follower portion, can be secured and a large component force along the right-left direction can be secured. Since the component force along the rotation direction of the drive cam is made small, it is possible to reduce a frictional force generated when the drive cam and the driven cam rotate relative to each other and to achieve a further improvement in operability. Since the component force along the right-left direction is made large, it is easy to secure an axial force that presses the side plate portion in the right-left direction via the cam follower portion. As a result, it is easy to secure a desired fastening force in the locked state.

Furthermore, it is possible to reduce manufacturing variability in comparison with a configuration in which the radius of curvature of a cam portion is made small. Therefore, it is possible to reduce variability in the position of contact between the cam portion and the cam follower portion for each product and to provide a steering device with excellent reliability.

(2) In the steering device according to the aspect (1), it is preferable that the first top portion is formed at an inner end portion of the first portion in the radial direction.

According to the aspect, the position of contact with the second portion on the first portion can be set to an innermost position in the radial direction and thus it is possible to more reliably reduce the torque around the second axis at the time of rotation of the rod.

(3) In the steering device according to aspect (1) or (2), it is preferable that the first clearance portion is formed as an inclined surface that extends to become farther from the second portion in the right-left direction from the first top portion toward the outer side in the radial direction.

According to the aspect, it is easy to secure the strength of the first portion in comparison with a configuration in which the first clearance portion is formed as a curved surface or formed in a stepped shape, for example.

(4) In the steering device according to any one of the aspects (1) to (3), it is preferable that the second portion includes a second top portion that comes into contact with the first top portion, and a second clearance portion that extends to become farther from the first portion in the right-left direction from the second top portion toward the outer side in the radial direction.

According to the aspect, it is easy to set the position of contact between the first portion and the second portion. Therefore, it is possible to reduce variability in the position of contact between the first portion and the second portion for each product and to provide a steering device with excellent reliability.

(5) In the steering device according to any one of the aspects (1) to (4), it is preferable that the drive cam includes a first restriction portion that bulges in the right-left direction from the drive base at a portion of the drive base that is positioned outside the cam portion in the radial direction, the driven cam includes a second restriction portion that bulges in the right-left direction from the driven base at a portion of the driven base that is positioned outside the cam follower portion in the radial direction, and in the locked state, the first restriction portion and the second restriction portion abut each other in the circumferential direction so that the cam portion is restricted from rotating toward the first side in the circumferential direction with respect to the cam follower portion.

According to the aspect, it is possible to reduce the outer diameters of the drive cam and the driven cam in comparison with a case where the first restriction portion and the cam portion are disposed on the same circumference and the second restriction portion and the cam follower portion are disposed on the same circumference. In addition, since the cam portion and the cam follower portion are disposed inside the restriction portions in the radial direction, it is easy to reduce the torque around the second axis at the time of rotation of the rod.

(6) In the steering device according to any one of the aspects (1) to (5), it is preferable that an urging member configured to urge the cam follower portion toward the cam portion is disposed between the driven cam and the side plate portion.

According to the aspect, it is easy to secure a load in the right-left direction that acts between the drive cam and the driven cam. Therefore, it is easy to secure a frictional force (a static frictional force) acting in the circumferential direction between the drive cam and the driven cam particularly when the lock mechanism is in the unlocked state. Accordingly, when the lock mechanism is in the unlocked state, the lock mechanism can be restrained from unintentionally transitioning to the locked state. As a result, in the unlocked state, an axial force acting because of the lock mechanism can be reduced, and the operability can be improved.

According to the aspects of the present disclosure, a desired fastening force and desired operation torque can be obtained.

DETAILED DESCRIPTION OF THE INVENTION

Next, an embodiment of the present disclosure will be described with reference to the drawings.

[Steering Device]

Figure 1:
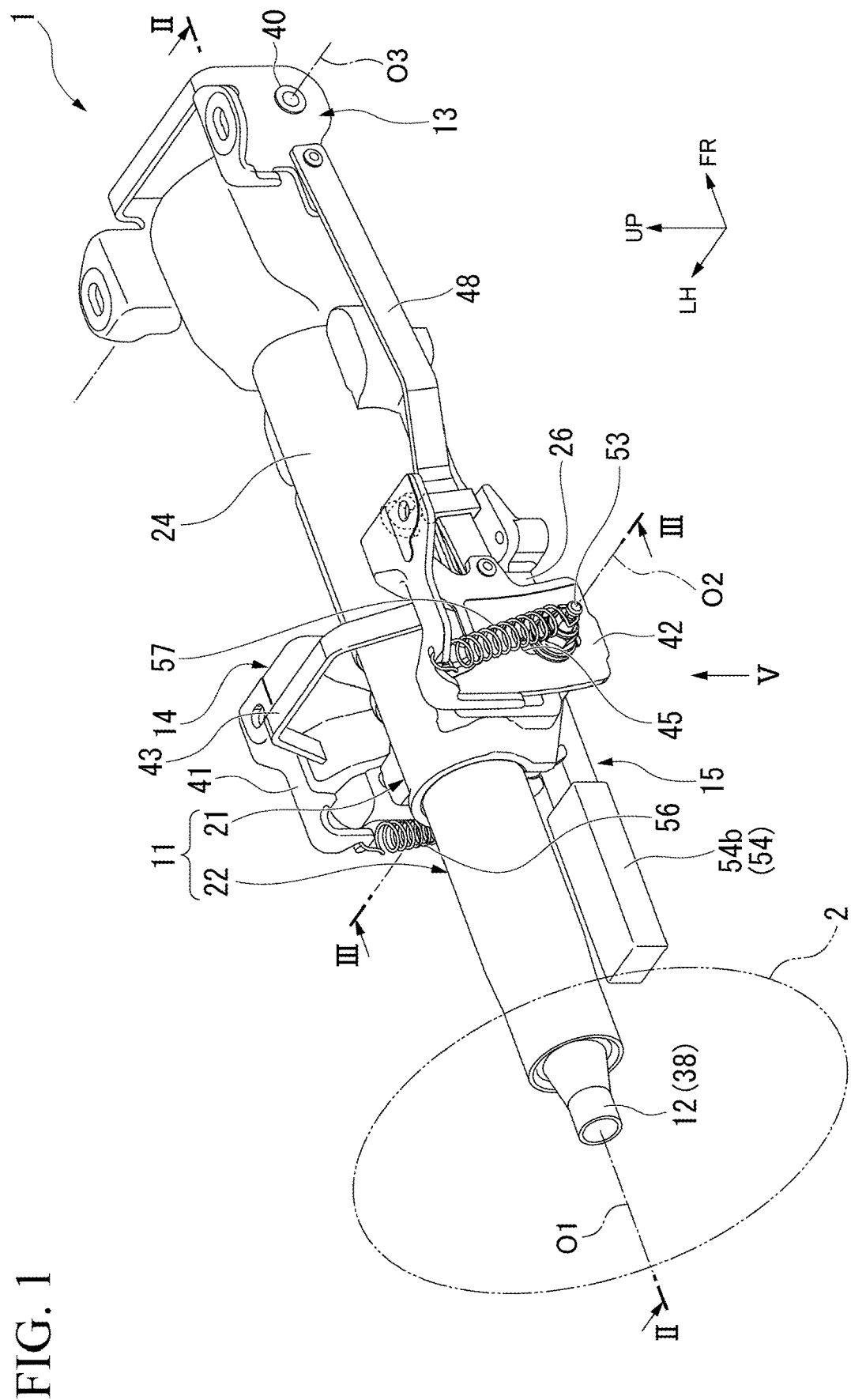
FIG. 1 is a perspective view of a steering device according to an embodiment.

FIG. 1 is a perspective view of a steering device 1.

As shown in FIG. 1, the steering device 1 is installed in a vehicle. The steering device 1 adjusts the steering angles of wheels as a steering wheel 2 is rotated.

The steering device 1 includes a column unit 11, a steering shaft 12, a front bracket 13 and a rear bracket 14 (brackets), and a lock mechanism 15. Each of the column unit 11 and the steering shaft 12 is formed along an axis (a first axis) O1. Therefore, in the following description, the direction in which the axis O1 of the column unit 11 and the steering shaft 12 extends may be simply referred to as a shaft axial direction, a direction orthogonal to the axis O1 may be referred to as a shaft radial direction, and a direction around the axis O1 may be referred to as a shaft circumferential direction.

The steering device 1 of the present embodiment is installed in the vehicle in a state where the axis O1 intersects a front-rear direction. Specifically, the axis O1 of the steering device 1 extends to become closer to an upper side toward a rear side. However, in the following description, for the sake of convenience, in the steering device 1, the shaft axial direction will be referred to as the front-rear direction. In this case, in the steering device 1, a direction toward the steering wheel 2 will be simply referred to as a rearward direction and a direction toward a side opposite to the steering wheel 2 will be simply referred to as a frontward direction (an arrow FR). Of the shaft radial directions, a vertical direction in a state where the steering device 1 is attached to the vehicle will be simply referred to as a vertical direction (an arrow UP represents an upward direction) and a right-left direction will be simply referred to as a right-left direction.

<Column Unit 11>

Figure 2:
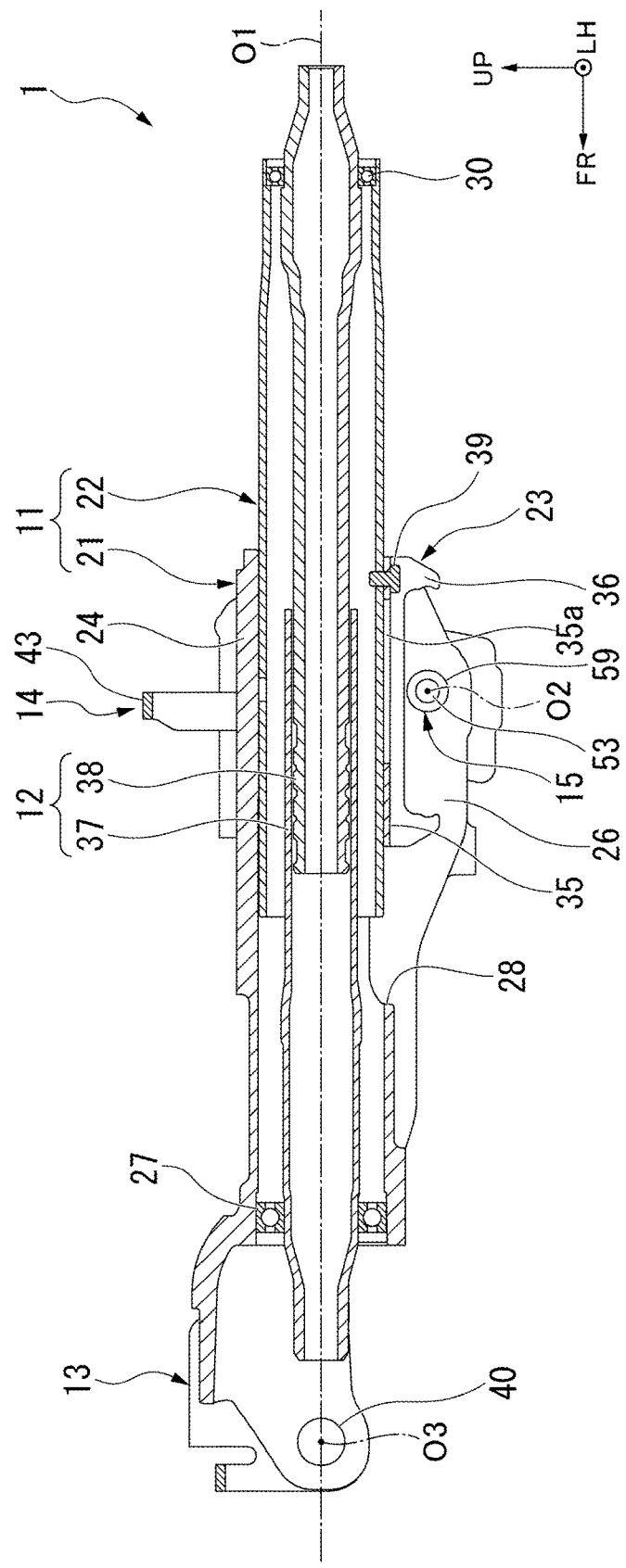
FIG. 2 is a cross-sectional view taken along line II-II of FIG. 1.

FIG. 2 is a cross-sectional view taken along line II-II of FIG. 1.

As shown in FIGS. 1 and 2, the column unit 11 includes an outer column 21, an inner column 22, and a hanger bracket 23.

The outer column 21 is attached to a vehicle body via the brackets 13 and 14. The outer column 21 includes a holding tubular portion 24, a first fastening portion 25 (refer to FIG. 3), and a second fastening portion 26.

The holding tubular portion 24 is formed in a tubular shape extending in the front-rear direction. A front bearing 27 is fitted (press-fitted) into a front end portion of the inside of the holding tubular portion 24. A slit 28 is formed at a portion in the shaft circumferential direction (in the present embodiment, a lower portion of the outer column 21) of a rear portion of the holding tubular portion 24. The slit 28 penetrates the outer column 21 in the shaft radial direction and is open at a rear end surface of the outer column 21.

Figure 3:
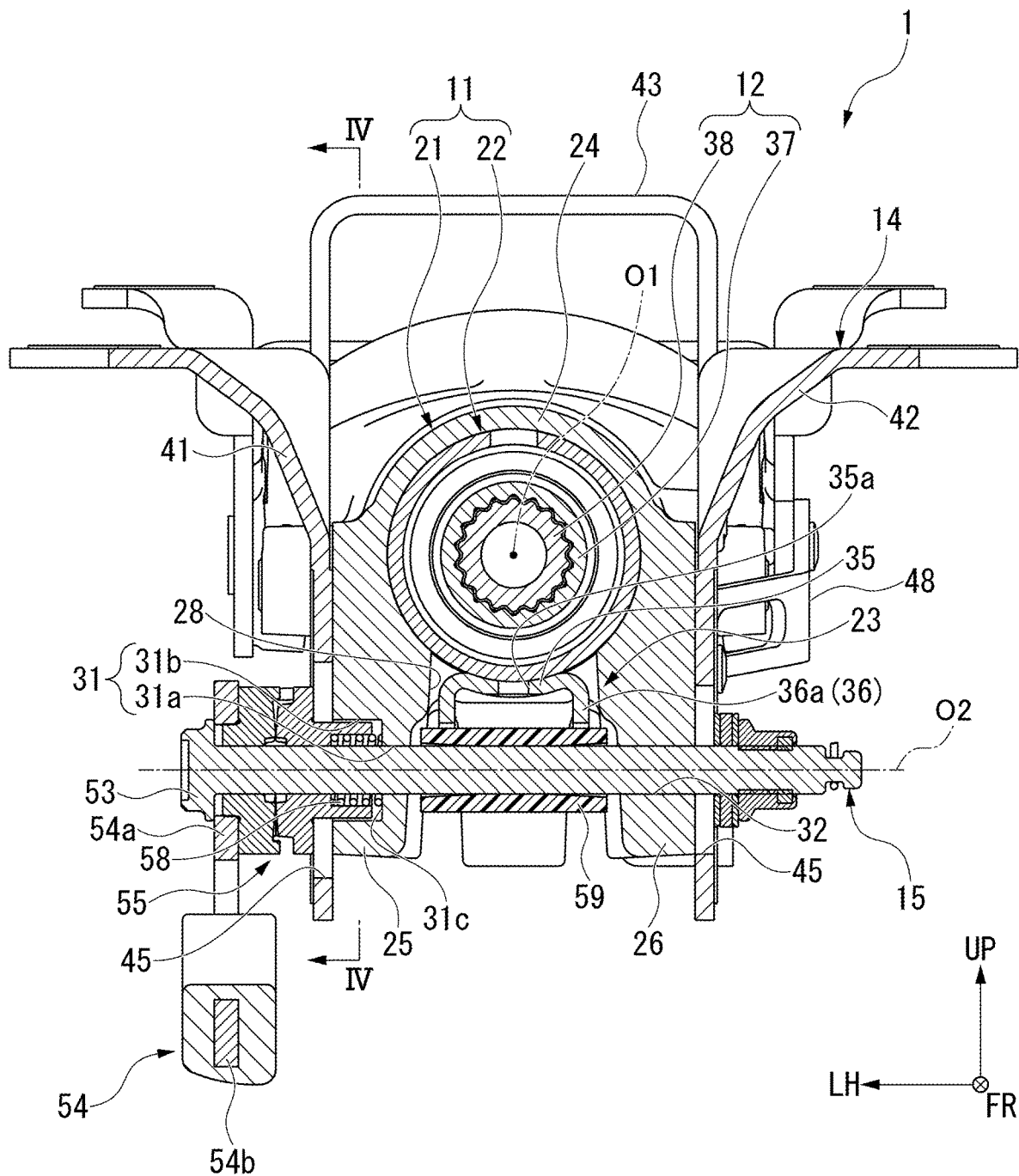
FIG. 3 is a cross-sectional view taken along line III-III of FIG. 1.

FIG. 3 is a cross-sectional view taken along line of FIG. 1.

As shown in FIG. 3, the fastening portions 25 and 26 extend downward from positions on the holding tubular portion 24 that face each other in the right-left direction with the slit 28 interposed therebetween. A first through-hole 31 that penetrates the first fastening portion 25 in the right-left direction is formed in the first fastening portion 25.

Figure 4:
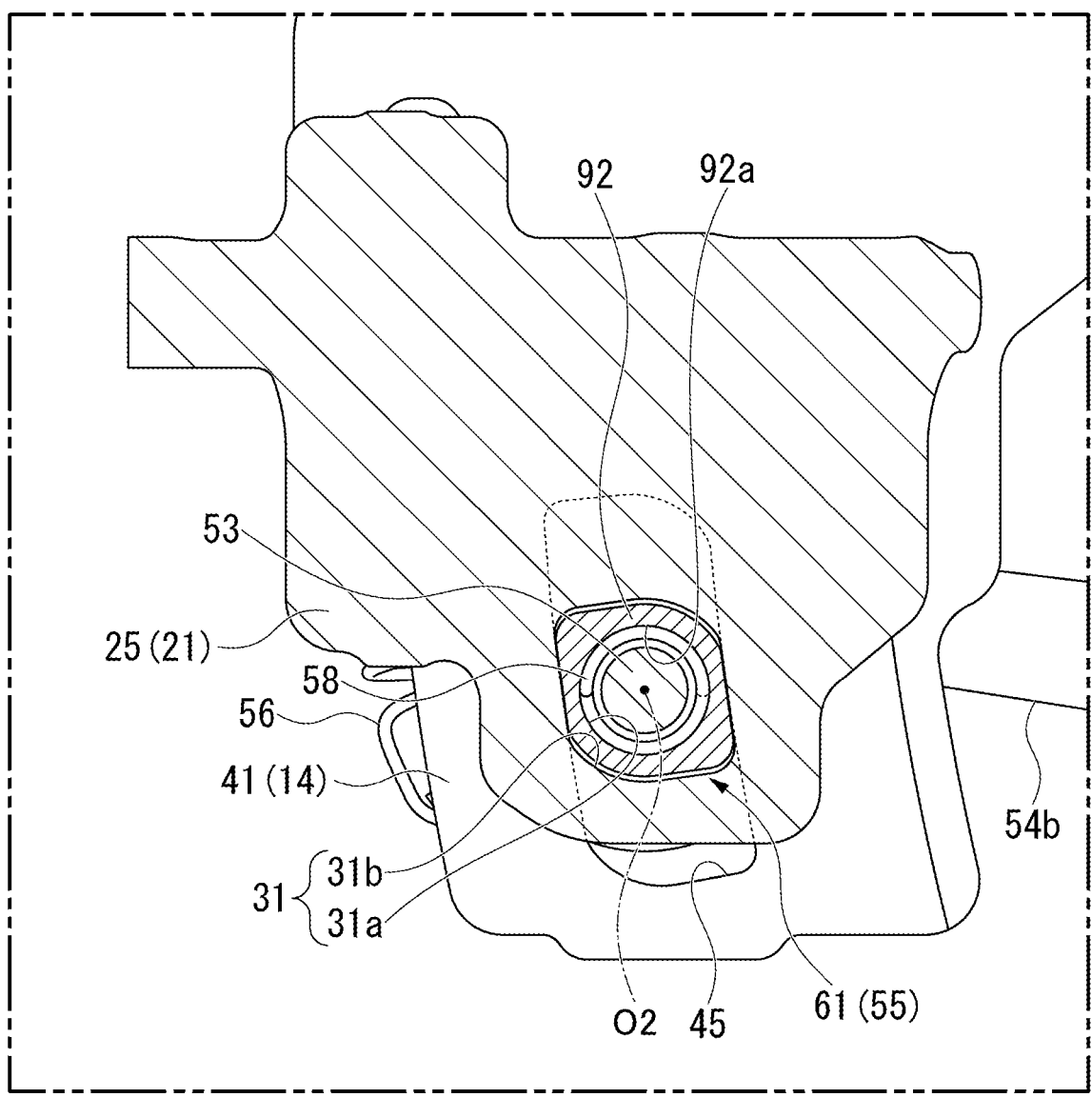
FIG. 4 is a cross-sectional view corresponding to line IV-IV of FIG. 3.
Figure 4:
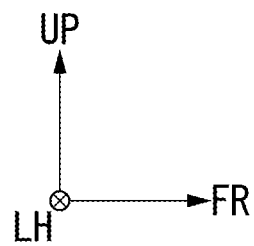

FIG. 4 is a cross-sectional view corresponding to line IV-IV of FIG. 3.

As shown in FIGS. 3 and 4, the first through-hole 31 is formed in a stepped hole-like shape. Specifically, the first through-hole 31 includes a bolt supporting hole 31a and a cam supporting hole 31b positioned outside the bolt supporting hole 31a in the right-left direction.

The bolt supporting hole 31a constitutes an inner portion of the first through-hole 31 in the right-left direction. As seen in a side view, the bolt supporting hole 31a is a round hole centered on an axis (a second axis) O2 extending in the right-left direction. The bolt supporting hole 31a is open at an inner end surface of the first fastening portion 25 in the right-left direction. In the following description, a direction intersecting the axis O2 as seen in a side view may be referred to as a bolt radial direction (a radial direction) and a direction around the axis O2 may be referred to as a bolt circumferential direction (a circumferential direction).

The cam supporting hole 31b is formed in a parallelogram-like shape, of which the diagonal lines intersect each other at the axis O2, as seen in a side view. One of two sets of opposite corners constituting the cam supporting hole 31b is smaller than the other of the two sets of opposite corners in radius of curvature. An inner end portion of the cam supporting hole 31b in the right-left direction is connected to the bolt supporting hole 31a via a step surface 31c. An outer end portion of the bolt supporting hole 31a in the right-left direction is open at the step surface 31c. An outer end portion of the cam supporting hole 31b in the right-left direction is open at an outer end surface of the first fastening portion 25 in the right-left direction.

As shown in FIG. 3, a second through-hole 32 that penetrates the second fastening portion 26 in the right-left direction is formed in the second fastening portion 26. The second through-hole 32 is a round hole that is formed to be coaxial with the axis O2 and that has the same diameter as the bolt supporting hole 31a.

As shown in FIG. 2, the inner column 22 is formed in a tubular shape extending in the front-rear direction. The outer diameter of the inner column 22 is smaller than the inner diameter of the holding tubular portion 24. The inner column 22 is inserted into the holding tubular portion 24 from behind. The inner column 22 is configured to be movable in the front-rear direction with respect to the outer column 21. A rear bearing 30 is fitted (press-fitted) into a rear end portion of the inside of the inner column 22.

Figure 5:
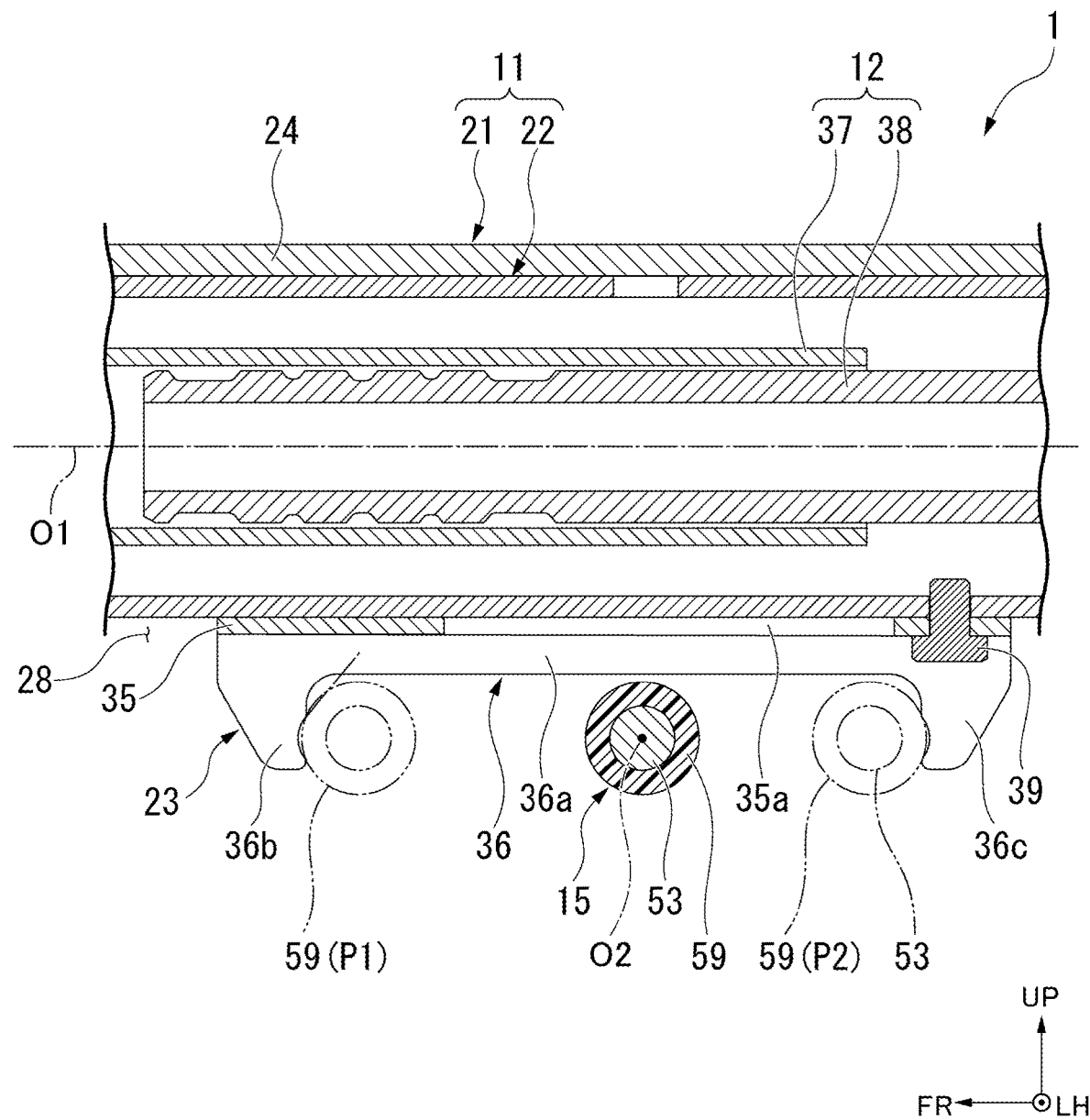
FIG. 5 is an enlarged view of the vicinity of a hanger bracket in FIG. 2.

FIG. 5 is an enlarged view of the vicinity of the hanger bracket 23 in FIG. 2.

As shown in FIGS. 3 and 5, the hanger bracket 23 is downwardly fixed to a lower portion of the inner column 22. The hanger bracket 23 is formed by, for example, performing presswork on a metal plate. The hanger bracket 23 is exposed to the outside of the holding tubular portion 24 through the slit 28 of the holding tubular portion 24. The hanger bracket 23 is formed in a U-like shape that is open to a lower side in a front view as seen in the front-rear direction.

The hanger bracket 23 includes an attachment plate portion 35 and guide walls 36 that extend downward from both end portions of the attachment plate portion 35 in the right-left direction.

The attachment plate portion 35, of which a thickness direction is the vertical direction, extends in the front-rear direction along an outer peripheral surface of the inner column 22. An energy absorbing (EA) elongated hole 35a that penetrates the attachment plate portion 35 in the vertical direction is formed in the attachment plate portion 35. The EA elongated hole 35a is formed in a slit-like shape extending in the front-rear direction.

The hanger bracket 23 is fixed to the inner column 22 by a bolt 39. The bolt 39 is inserted with respect to a rear end portion of the EA elongated hole 35a from below to be fastened to the inner column 22. Accordingly, the hanger bracket 23 is restricted from moving in the front-rear direction with respect to the inner column 22 during a telescopic operation (is moved integrally with the inner column 22).

The guide walls 36 are formed over the entire length of the attachment plate portion 35. Each guide wall 36 includes a telescopic guide portion 36a and telescopic stoppers 36b and 36c.

The telescopic guide portion 36a is formed at a portion of the guide wall 36 excluding both front and rear end portions. A lower end edge of the telescopic guide portion 36a is formed in a linear shape along the front-rear direction.

As shown in FIG. 5, the telescopic stoppers 36b and 36c are a front telescopic stopper 36b positioned at a front end portion of the guide wall 36 and a rear telescopic stopper 36c positioned at a rear end portion of the guide wall 36. The front telescopic stopper 36b protrudes downward with respect to the telescopic guide portion 36a. The front telescopic stopper 36b restricts the inner column 22 from moving forward with respect to the outer column 21 during the telescopic operation. The rear telescopic stopper 36c protrudes downward with respect to the telescopic guide portion 36a. The rear telescopic stopper 36c restricts the inner column 22 from moving rearward with respect to the outer column 21 during the telescopic operation.

<Steering Shaft 12>

As shown in FIG. 2, the steering shaft 12 includes an outer shaft 37 and an inner shaft 38.

The outer shaft 37 is formed in a hollow tubular shape extending in the front-rear direction. The outer shaft 37 is inserted into the column unit 11. A front end portion of the outer shaft 37 is press-fitted into the front bearing 27 in the outer column 21. Accordingly, the outer shaft 37 is supported by the outer column 21 so as to be rotatable around the axis O1. The front end portion of the outer shaft 37 (a portion that protrudes forward beyond the front bearing 27) is connected to, for example, a steering gear box (not shown) or the like via a universal joint (not shown) or the like.

The inner shaft 38 extends in the front-rear direction. The inner shaft 38 is inserted into the inner column 22. The rear end portion of the inner shaft 38 is press-fitted into the rear bearing 30 in the inner column 22. Accordingly, the inner shaft 38 is supported by the inner column 22 so as to be rotatable around the axis O1. The steering wheel 2 (refer to FIG. 1) is connected to a portion of the inner shaft 38 that protrudes rearward beyond the inner column 22.

A front end portion of the inner shaft 38 is inserted into the outer shaft 37 in the inner column 22. The inner shaft 38 is configured to be movable in the front-rear direction with respect to the outer shaft 37 together with the inner column 22 as the inner column 22 moves in the front-rear direction with respect to the outer column 21.

A female spline is formed on an inner peripheral surface of the outer shaft 37. The female spline engages with a male spline formed on an outer peripheral surface of the inner shaft 38. As a result, the inner shaft 38 moves in the front-rear direction with respect to the outer shaft 37 in a state of being restricted from rotating relative to the outer shaft 37. A telescopic structure of the steering shaft 12 and a rotation restriction structure can be modified as appropriate. In the present embodiment, a configuration in which the outer shaft 37 is disposed ahead of the inner shaft 38 has been described. However, the present disclosure is not limited thereto and a configuration in which the outer shaft 37 is disposed behind the inner shaft 38 may also be adopted.

<Brackets 13 and 14>

As shown in FIG. 1, the front bracket 13 connects the vehicle body and the outer column 21 to each other. The front bracket 13 is formed in a U-like shape that is open to a lower side in a front view. The front bracket 13 surrounds the rear end portion of the outer column 21 on an upper side and both sides in the right-left direction. The front bracket 13 is connected to the outer column 21 via a pivot shaft 40 extending in the right-left direction. Accordingly, the outer column 21 is supported by the front bracket 13 so as to be rotatable around an axis O3 that extends in the right-left direction.

The rear bracket 14 connects the vehicle body and the outer column 21 to each other at a position behind the front bracket 13. The rear bracket 14 is formed in a U-like shape that is open to the lower side in the front view. The rear bracket 14 surrounds an upper side and both sides in the right-left direction of the outer column 21.

The rear bracket 14 includes a first side plate portion 41 that is disposed on a first side (a left side) in the right-left direction with respect to the column unit 11, a second side plate portion 42 that is disposed on a second side (a right side) in the right-left direction with respect to the column unit 11, and a bridge portion 43 that connects the side plate portions 41 and 42 to each other. As shown in FIG. 3, a tilt guide hole 45 that penetrates each of the side plate portions 41 and 42 in the right-left direction is formed in each of the side plate portions 41 and 42. The tilt guide hole 45 is an elongated hole extending in the vertical direction. Specifically, the tilt guide hole 45 is formed in an arc shape of which the center of curvature is the axis O3 and that is curved rearward (refer to FIG. 4).

The bridge portion 43 connects upper end portions of the side plate portions 41 and 42 to each other. The bridge portion 43 is formed in an arch-like shape that protrudes upward. The bridge portion 43 is positioned on the rotation locus of the column unit 11 when the column unit 11 is tilted. When the column unit 11 is tilted, the column unit 11 approaches the bridge portion 43 from below or is separated from the bridge portion 43. The front bracket 13 and the rear bracket 14 are connected to each other by a connection piece 48 (refer to FIG. 1). A thickness direction of the connection piece 48 is the right-left direction and the connection piece 48 extends in the front-rear direction. The connection piece 48 restricts the front bracket 13 from moving (rotating) with respect to the rear bracket 14. The connection piece 48 is not an essential component.

<Lock Mechanism 15>

As shown in FIG. 3, the lock mechanism 15 includes a lock bolt (a rod) 53, an operation lever 54, a fastening cam 55, a first urging member 56, a second urging member 57, and a cam urging member (an urging member) 58.

The lock bolt 53 is disposed to be coaxial with the axis O2. The lock bolt 53 penetrates the side plate portions 41 and 42 and the fastening portions 25 and 26 in the right-left direction through the tilt guide holes 45 and the through-holes 31 and 32. At the time of a telescopic operation, the inner column 22 or the like moves forward and backward such that the lock bolt 53 moves forward and backward along the telescopic guide portions 36a. At the time of a tilting operation, the lock bolt 53 moves upward and downward together with the column unit 11 by moving upward and downward in the tilt guide holes 45.

A collar 59 is mounted onto a central portion of the lock bolt 53 (a portion positioned between the fastening portions 25 and 26). The collar 59 is formed in a tubular shape that is coaxial with the lock bolt 53. The collar 59 is formed of a material that is softer than the lock bolt 53 (for example, an elastically deformable material such as rubber or a resin material). As shown in FIG. 5, at the time of a telescopic operation, the collar 59 abuts onto the front telescopic stoppers 36b from behind when the inner column 22 is at the foremost position (when the column unit 11 is at a maximum contraction position P1). Meanwhile, at the time of a telescopic operation, the collar 59 abuts onto the rear telescopic stoppers 36c from ahead when the inner column 22 is at the rearmost position (when the column unit 11 is at a maximum expansion position P2). The lock bolt 53 abuts onto the telescopic stoppers 36b and 36c via the collar 59. The lock mechanism 15 may be configured such that the lock bolt 53 directly abuts onto the telescopic stoppers 36b and 36c.

Figure 6:
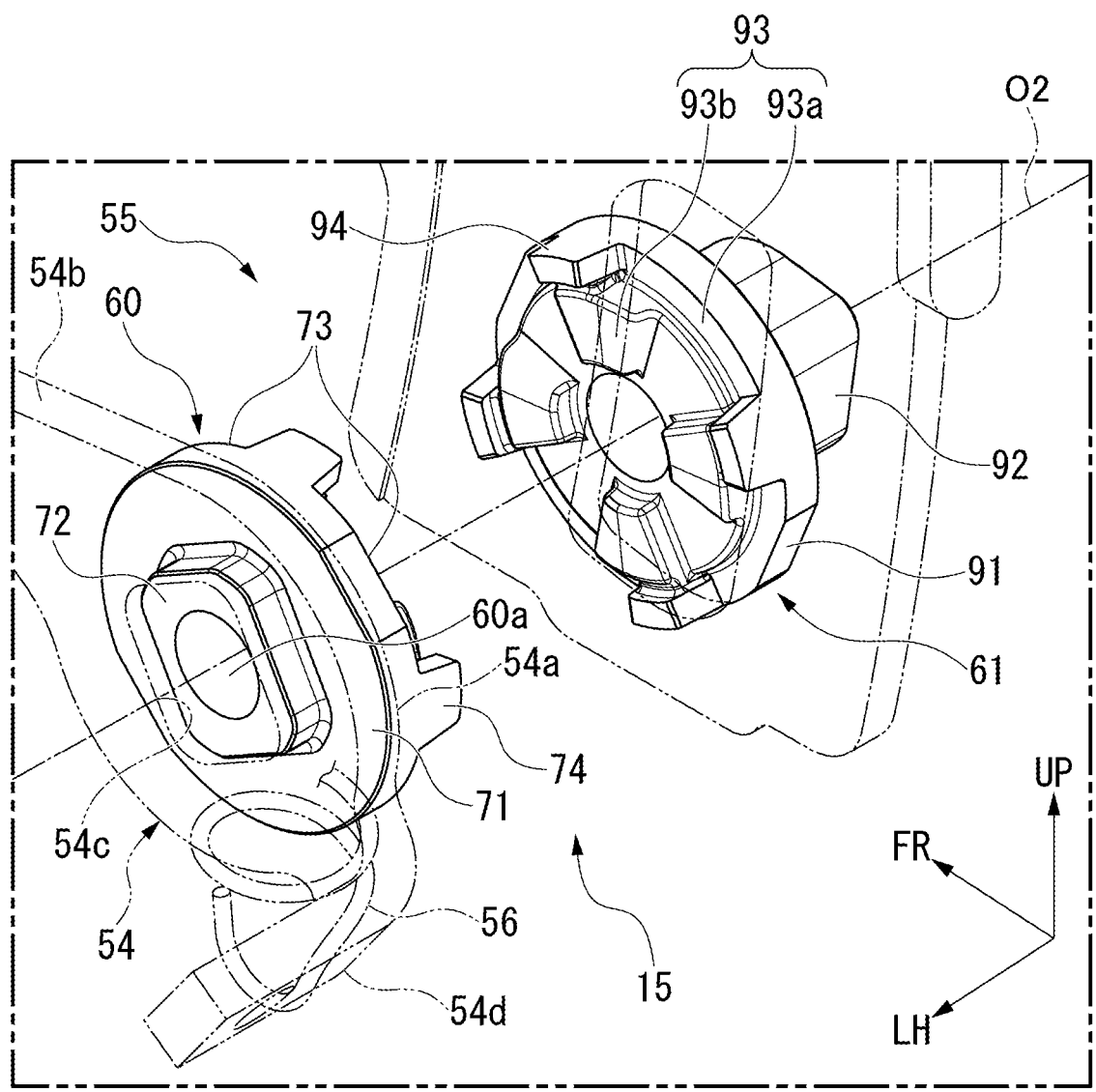
FIG. 6 is an exploded perspective view of a fastening cam.

FIG. 6 is an exploded perspective view of the fastening cam 55.

As shown in FIGS. 1, 4, and 6, the operation lever 54 is connected to a left side end portion of the lock bolt 53. The operation lever 54 includes a connection portion 54a and a transmission portion 54b.

As shown in FIG. 6, the connection portion 54a is formed in a disk-like shape disposed to be coaxial with the axis O2. As shown in FIG. 5, a positioning hole 54c that penetrates the connection portion 54a in the right-left direction is formed in the connection portion 54a. The positioning hole 54c is formed in a rectangular shape as seen in a side view. The lock bolt 53 penetrates the positioning hole 54c in the right-left direction. A locking piece 54d is formed at a lower portion of a rear end of the connection portion 54a. The locking piece 54d protrudes outward in the right-left direction from the connection portion 54a.

As shown in FIG. 1, the transmission portion 54b extends rearward from the connection portion 54a. The operation lever 54 is configured to be rotatable around the axis O2 together with the lock bolt 53 by being pressed down or pulled up via a rear end portion of the transmission portion 54b.

As shown in FIG. 3, the fastening cam 55 is disposed between the operation lever 54 and the rear bracket 14 (the first side plate portion 41). The fastening cam 55 is configured such that the thickness thereof in the right-left direction is changed as the operation lever 54 is rotated. The steering device 1 is configured such that the fastening portions 25 and 26 approach each other or are separated from each other in the right-left direction via the first side plate portion 41 (the width (an interval) of the slit 28 in the right-left direction is increased or decreased) when the thickness of the fastening cam 55 is changed. Specifically, when the operation lever 54 is rotated such that the thickness of the fastening cam 55 is increased, the fastening portions 25 and 26 approach each other together with the side plate portions 41 and 42 and thus the diameter of the holding tubular portion 24 is decreased. Accordingly, the inner column 22 is clamped by the holding tubular portion 24 and the telescopic operation and the tilting operation are restricted (a locked state). Meanwhile, when the operation lever 54 is rotated in the locked state such that the thickness of the fastening cam 55 is decreased, the fastening portions 25 and 26 are separated from each other together with the side plate portions 41 and 42 and thus the diameter of the holding tubular portion 24 is increased. Accordingly, the inner column 22 clamped by the holding tubular portion 24 is released and the telescopic operation and the tilting operation are allowed (an unlocked state).

Figure 7:
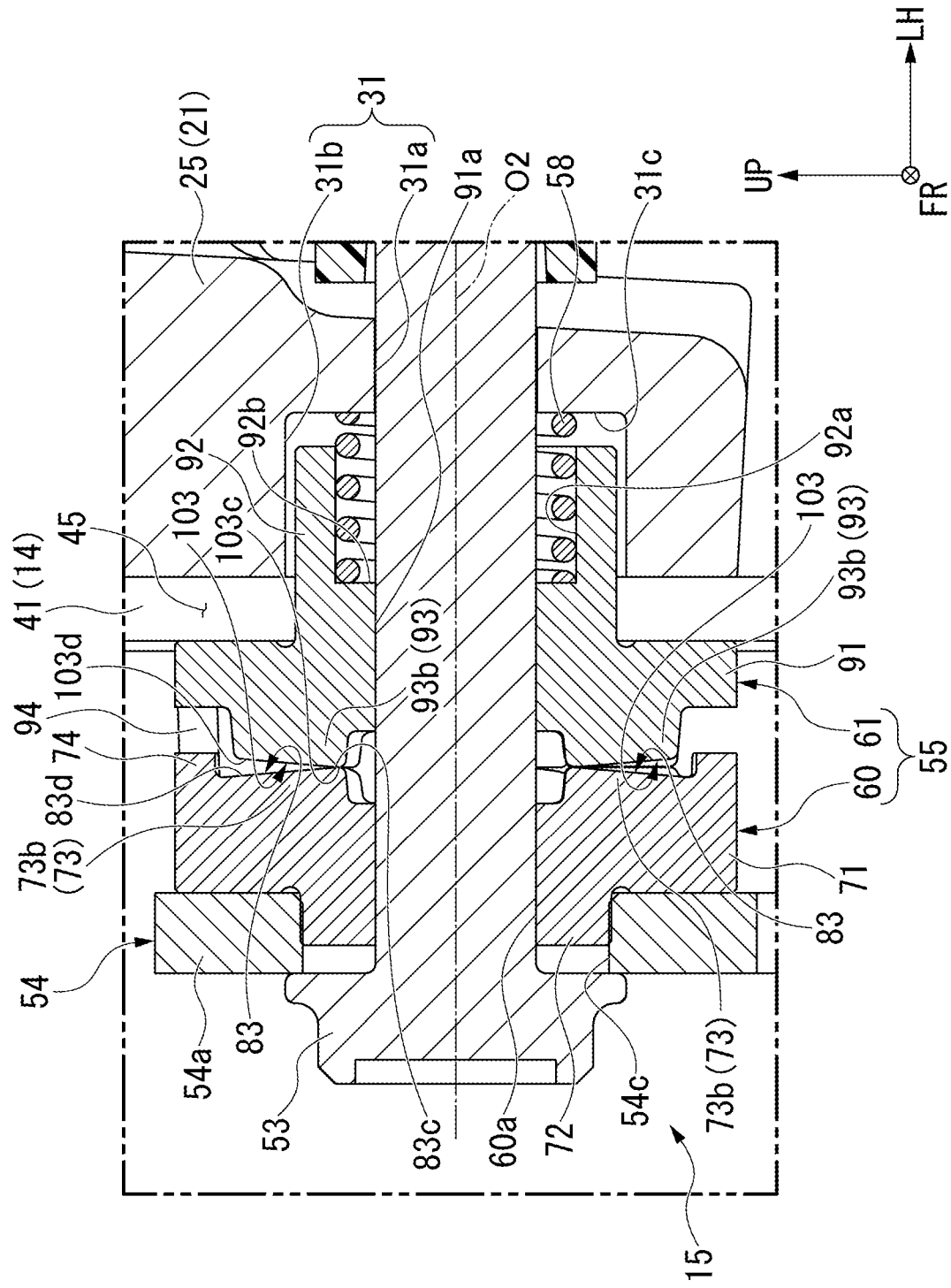
FIG. 7 is an enlarged view of a main portion of FIG. 3.
Figure 8:
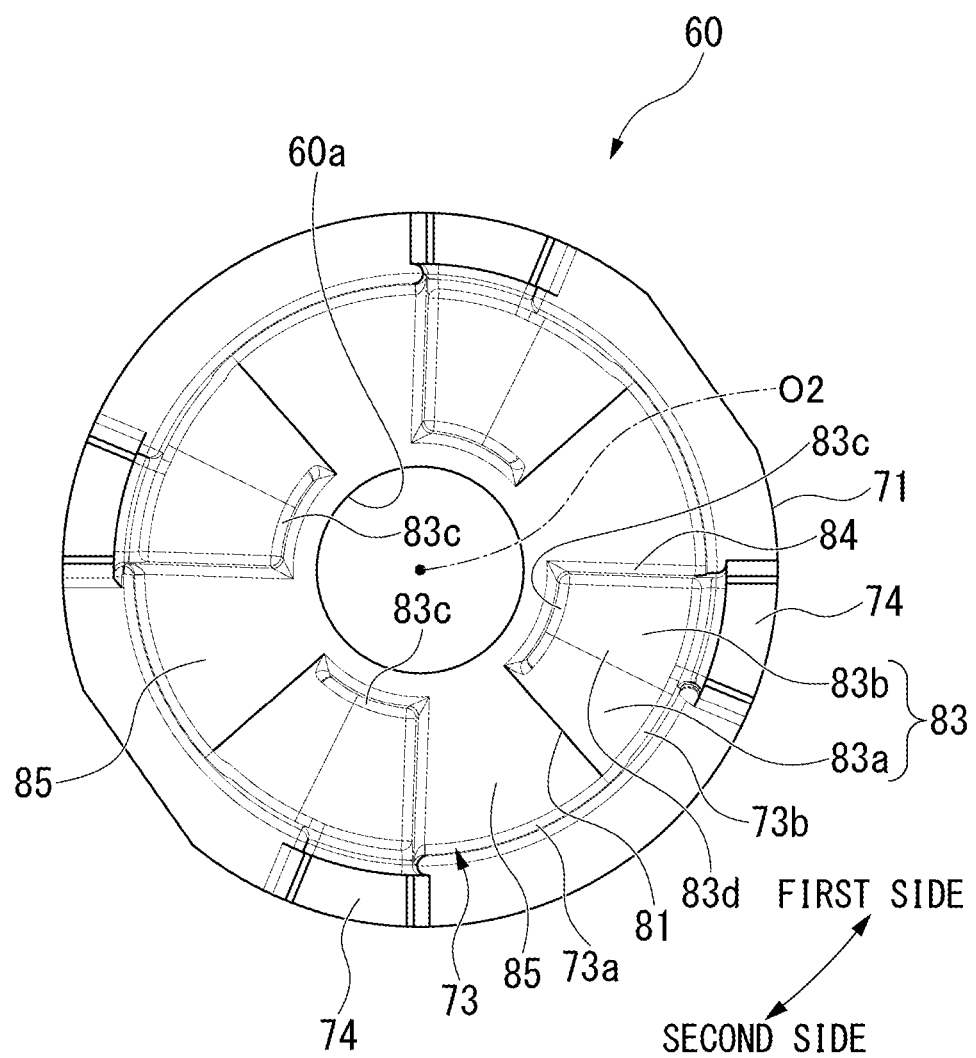
FIG. 8 is a plan view of a drive cam.

FIG. 7 is an enlarged view of a main portion of FIG. 3. FIG. 8 is a plan view of a drive cam 60.

As shown in FIGS. 6 to 8, the fastening cam 55 includes the drive cam 60 and a driven cam 61.

The drive cam 60 is connected to the operation lever 54 not to be rotatable relative to the operation lever 54 (connected to the operation lever 54 to be rotatable integrally with the operation lever 54). The drive cam 60 is made of a material having a hardness higher than the side plate portions 41 and 42 (for example, a sintered material or the like of an iron-based material).

The drive cam 60 includes a drive base 71, a holding portion 72, a cam portion (a first portion) 73, and a plurality of restriction portions (first restriction portions) 74.

The drive base 71 is formed in a disk-like shape disposed to be coaxial with the axis O2. The drive base 71 is disposed inside the connection portion 54a in the right-left direction such that the drive base 71 overlaps with the connection portion 54a.

The holding portion 72 bulges outward in the right-left direction from a portion of the drive base 71 that includes a portion on the axis O2. A passage hole 60a that the lock bolt 53 penetrates is formed in the holding portion 72 and the drive base 71. The drive cam 60 is supported to be rotatable with respect to the lock bolt 53 around the axis O2. The holding portion 72 is formed in a rectangular shape corresponding to the positioning hole 54c as seen in a side view. The holding portion 72 is fitted into the positioning hole 54c. Accordingly, the drive cam 60 is restricted from rotating relative to the operation lever 54 around the axis O2.

The cam portion 73 surrounds the passage hole 60a along the bolt circumferential direction at an inner peripheral portion of the drive base 71. The cam portion 73 includes a pedestal portion 73a and a plurality of cam projections 73b.

The pedestal portion 73a bulges inward in the right-left direction from the drive base 71. The pedestal portion 73a is formed in an annular shape surrounding the passage hole 60a.

On the pedestal portion 73a, the plurality of (for example, four) cam projections 73b are formed at intervals in the bolt circumferential direction. The cam projections 73b have the same shape as each other. Therefore, in the following description, details of the cam projections 73b will be described by using one cam projection 73b as an example.

Figure 9:
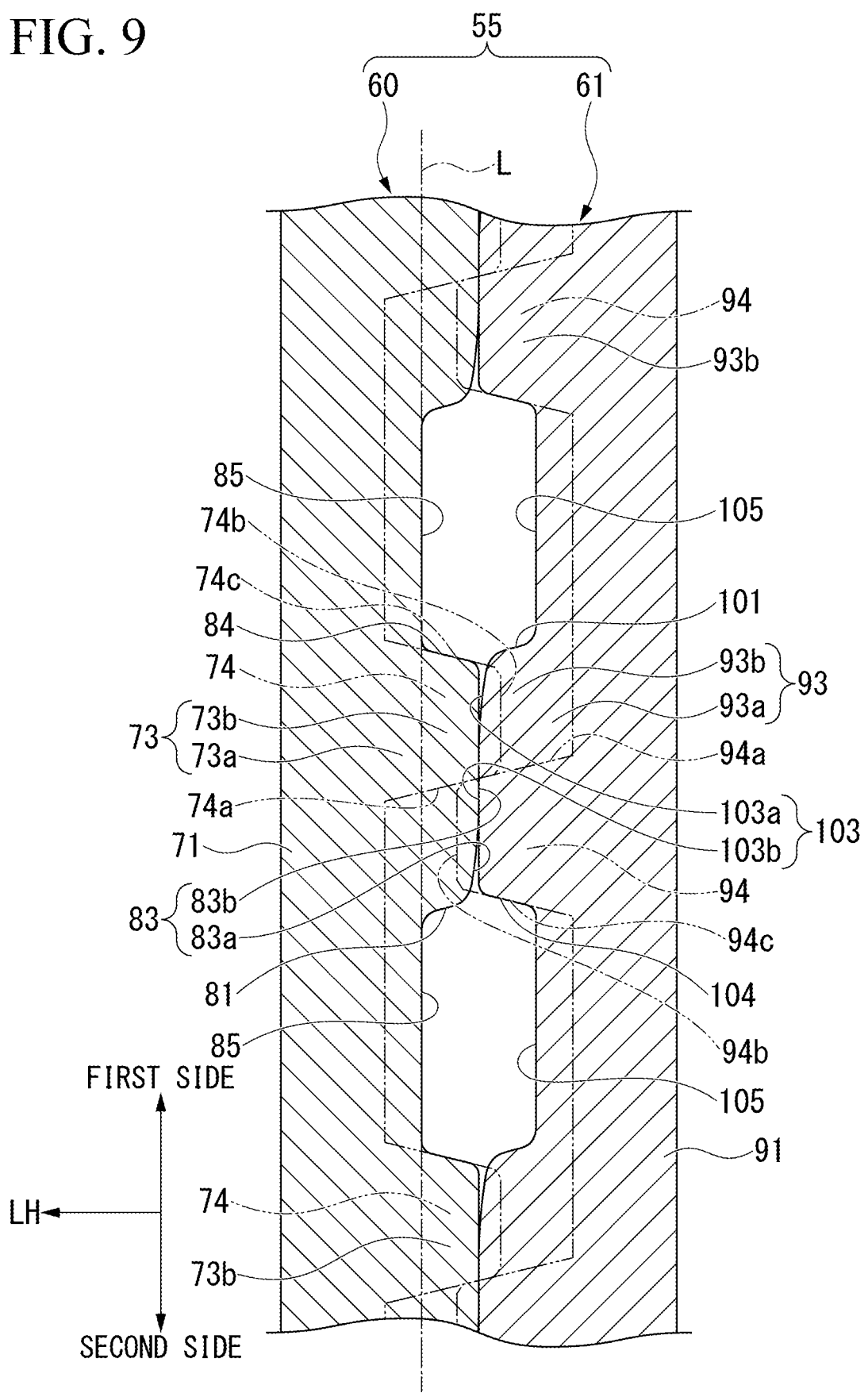
FIG. 9 is a net obtained when the fastening cam is laid out around an axis.

FIG. 9 is a net obtained when the fastening cam 55 in the locked state is laid out around the axis O2.

As shown in FIGS. 8 and 9, the cam projection 73*b* bulges inward in the right-left direction from the pedestal portion 73*a*. The cam projection 73*b* is formed in a fan-like shape of which the width in the bolt circumferential direction gradually increases toward an outer side in the bolt radial direction as seen in a side view. Peripheral surfaces of the cam projection 73*b* include a first side surface 81, a lock surface 83, and a second side surface 84 as seen in the bolt radial direction.

The first side surface 81 extends to become closer to an inner side in the right-left direction toward a first side (a second side) in the bolt circumferential direction. The first side surface 81 is formed in a linear shape or in an arc shape that protrudes toward a second side (a first side) in the bolt circumferential direction as seen in the bolt radial direction.

The lock surface 83 is a surface of the cam projection 73*b* that faces the inner side in the right-left direction. The lock surface 83 is connected to an end portion of the first side surface 81 that is on the first side in the bolt circumferential direction. The lock surface 83 includes a transition surface 83*a* and a pressing surface 83*b*.

The transition surface 83*a* is smoothly connected to the first side surface 81. In an example shown in the drawings, a boundary portion between the first side surface 81 and the transition surface 83*a* is a curved surface. The transition surface 83*a* extends to become closer to the inner side in the right-left direction toward the first side in the bolt circumferential direction. The transition surface 83*a* is formed in an arc shape that protrudes toward the inner side in the right-left direction or in a linear shape as seen in the bolt radial direction. As seen in the bolt radial direction, an angle formed between an imaginary line L orthogonal to the axis O2 and the transition surface 83*a* is smaller than an angle formed between the imaginary line L and the first side surface 81.

The pressing surface 83*b* is connected to a portion of the transition surface 83*a* that is on the first side in the bolt circumferential direction. As seen in the bolt radial direction, the pressing surface 83*b* extends linearly along the bolt circumferential direction (is a flat surface). However, the lock surface 83 may be formed as a flat surface as a whole as seen in the bolt radial direction or formed in an arc shape that protrudes inward in the right-left direction.

The second side surface 84 is connected to a portion of the pressing surface 83*b* that is on the first side in the bolt circumferential direction. The second side surface 84 extends to become closer to an outer side in the right-left direction toward the first side in the bolt circumferential direction. As seen in the bolt radial direction, the second side surface 84 is formed in a linear shape. As seen in the bolt radial direction, an angle formed between the imaginary line L and the second side surface 84 is larger than the angle formed between the imaginary line L and the first side surface 81.

A portion of the pedestal portion 73*a* that is positioned between the cam projections 73*b* adjacent to each other in the bolt circumferential direction constitutes a release surface 85. The release surface 85 is formed as a flat surface orthogonal to the right-left direction. As seen in a side view, the release surface 85 is formed to have the same outer shape as the outer shape of the cam projection 73*b*.

The restriction portions 74 are formed at intervals in the bolt circumferential direction on a portion of the drive base 71 that is positioned outside the cam portion 73 in the bolt radial direction. The restriction portion 74 and the cam projection 73*b* that correspond to each other partially overlap with each other as seen in the bolt radial direction. All of the restriction portions 74 have the same shape as each other. Therefore, in the following description, details of the restriction portions 74 will be described by using one restriction portion 74 as an example.

The restriction portion 74 bulges inward in the right-left direction from the drive base 71. As seen in the bolt radial direction, peripheral surfaces of the restriction portion 74 include a lock position restriction surface 74*a*, a top surface 74*b*, and a release position restriction surface 74*c*.

As seen in the bolt radial direction, the lock position restriction surface 74*a* extends to become closer to the inner side in the right-left direction toward the first side in the bolt circumferential direction from a portion that is positioned closer to the first side in the bolt circumferential direction than the transition surface 83*a* is. As seen in the bolt radial direction, the lock position restriction surface 74*a* is formed in a linear shape. An angle formed between the imaginary line L and the lock position restriction surface 74*a* is equal to or larger than the angle formed between the imaginary line L and the first side surface 81.

The top surface 74*b* linearly extends to the first side in the bolt circumferential direction from an inner end portion of the lock position restriction surface 74*a* in the right-left direction. The top surface 74*b* is positioned inside the pressing surface 83*b* in the right-left direction.

The release position restriction surface 74*c* is connected to an end portion of the top surface 74*b* that is on the first side in the bolt circumferential direction. The release position restriction surface 74*c* extends to become closer to the outer side in the right-left direction toward the first side in the bolt circumferential direction. As seen in the bolt radial direction, the release position restriction surface 74*c* is formed in a linear shape. In the example shown in the drawings, an angle formed between the imaginary line L and the release position restriction surface 74*c* is equal to the angle formed between the imaginary line L and the lock position restriction surface 74*a*. The release position restriction surface 74*c* and the second side surface 84 of the cam projection 73*b* corresponding to the release position restriction surface 74*c* are positioned on the same plane in the bolt radial direction.

As shown in FIGS. 4, 6, and 7, the driven cam 61 is movable upward and downward along the tilt guide hole 45 and is supported not to be rotatable relative to the first side plate portion 41 and the outer column 21. As with the drive cam 60, the driven cam 61 is made of a material having a hardness higher than the side plate portions 41 and 42.

The driven cam 61 includes a driven base 91, a holding portion 92, a cam follower portion (a second portion) 93, and a plurality of restriction portions (second restriction portions) 94. Surfaces of the drive cam 60 and the driven cam 61 (surfaces of the drive base 71 and the driven base 91, surfaces of the cam portion 73 and the cam follower portion 93, and surfaces of the restriction portions 74 and 94) that face each other in the right-left direction have the same shape as each other.

The driven base 91 is formed in a disk-like shape disposed to be coaxial with the axis O2. The driven base 91 is disposed outside the first side plate portion 41 in the right-left direction such that the driven base 91 overlaps with the tilt guide hole 45. A passage hole 91*a* is formed in a portion of the driven base 91 that is positioned on the axis O2. The passage hole 91*a* is a round hole through which the lock bolt 53 can be inserted.

The holding portion 92 bulges inward in the right-left direction from a portion of the driven base 91 that includes a portion on the axis O2. The holding portion 92 is formed in a parallelogram-like shape formed in imitation of the cam supporting hole 31*b* as seen in a side view. The holding portion 92 is accommodated into the cam supporting hole 31*b* through the tilt guide hole 45 of the first side plate portion 41. Accordingly, the driven cam 61 is held not to be rotatable relative to the first side plate portion 41 and the outer column 21.

A spring support portion 92*a* is formed in the holding portion 92. The spring support portion 92*a* is a round hole formed to have a diameter larger than that of the passage hole 91*a*. The spring support portion 92*a* is open at an inner end surface of the holding portion 92 in the right-left direction. An inner end portion of the spring support portion 92*a* in the right-left direction is connected to the passage hole 91*a* via a step surface 92*b* (refer to FIG. 7). The passage hole 91*a* is open at a portion of the step surface 92*b* that is positioned on the axis O2. The lock bolt 53 penetrates the driven cam 61 in the right-left direction through the passage hole 91*a* and the spring support portion 92*a*. Accordingly, the driven cam 61 is supported to be movable in the right-left direction with respect to the lock bolt 53.

The cam follower portion 93 surrounds the passage hole 91*a* along the bolt circumferential direction at an inner peripheral portion of the driven base 91. The cam follower portion 93 includes a pedestal portion 93*a* and a plurality of follower projections 93*b*.

The pedestal portion 93*a* bulges outward in the right-left direction from the driven base 91. The pedestal portion 93*a* is formed in an annular shape surrounding the passage hole 91*a*.

On the pedestal portion 93*a*, the plurality of (for example, four) follower projections 93*b* are formed at intervals in the bolt circumferential direction. All of the follower projections 93*b* have the same shape as each other. Therefore, in the following description, details of the follower projections 93*b* will be described by using one follower projection 93*b* as an example.

The follower projection 93*b* bulges outward in the right-left direction from the pedestal portion 93*a*. The follower projection 93*b* is formed in a fan-like shape of which the width in the bolt circumferential direction gradually increases toward the outer side in the bolt radial direction as seen in a side view. The follower projection 93*b* faces the cam projection 73*b* of the drive cam 60 in the right-left direction in the locked state (refer to FIG. 9) and is positioned between the cam projections 73*b* adjacent to each other in the unlocked state (refer to FIG. 11). Peripheral surfaces of the follower projection 93*b* include a first side surface 101, a lock surface 103, and a second side surface 104 as seen in the bolt radial direction.

The first side surface 101 extends to become closer to the outer side in the right-left direction toward the second side in the bolt circumferential direction. In the unlocked state, the first side surface 101 faces the first side surface 81 in the bolt circumferential direction (refer to FIG. 11). The first side surface 101 slides on the first side surface 81 as the operation lever 54 is rotated.

The lock surface 103 is a surface of the follower projection 93*b* that faces the outer side in the right-left direction. The lock surface 103 is connected to an end portion of the first side surface 101 that is on the second side in the bolt circumferential direction. The lock surface 103 includes a transition surface 103*a* and a pressing surface 103*b*.

The transition surface 103*a* is smoothly connected to an end portion of the first side surface 101 that is on the second side in the bolt circumferential direction. The transition surface 103*a* extends to become closer to the outer side in the right-left direction toward the second side in the bolt circumferential direction. The transition surface 103*a* slides on the transition surface 83*a* of the drive cam 60 as the operation lever 54 is rotated.

The pressing surface 103*b* is connected to a portion of the transition surface 103*a* that is on the second side in the bolt circumferential direction. As seen in the bolt radial direction, the pressing surface 103*b* extends linearly along the bolt circumferential direction (is a flat surface). The pressing surface 103*b* faces the release surface 85 in the right-left direction in the unlocked state (refer to FIG. 11) and faces the pressing surface 83*b* in the right-left direction in the locked state (refer to FIG. 9). The lock surface 103 may be formed as a flat surface as a whole as seen in the bolt radial direction or formed in an arc shape that protrudes inward in the right-left direction.

The second side surface 104 is connected to a portion of the pressing surface 103*b* that is on the second side in the bolt circumferential direction. The second side surface 104 extends to become closer to the inner side in the right-left direction toward the second side in the bolt circumferential direction. In the unlocked state, the second side surface 104 approaches the second side surface 84 or abuts onto the second side surface 84 from the first side in the bolt circumferential direction.

A portion of the pedestal portion 93*a* that is positioned between the follower projections 93*b* adjacent to each other in the bolt circumferential direction constitutes a release surface 105. The release surface 105 is formed as a flat surface orthogonal to the right-left direction. In the unlocked state, the pressing surface 83*b* faces the release surface 105 in the right-left direction.

The restriction portions 94 are formed at intervals in the bolt circumferential direction on a portion of the driven base 91 that is positioned outside the cam follower portion 93 in the bolt radial direction. The restriction portion 94 and the follower projection 93*b* that correspond to each other overlap with each other as seen in the bolt radial direction.

The restriction portion 94 bulges outward in the right-left direction from the driven base 91. As seen in the bolt radial direction, peripheral surfaces of the restriction portion 94 include a lock position restriction surface 94*a*, a top surface 94*b*, and a release position restriction surface 94*c*.

As seen in the bolt radial direction, the lock position restriction surface 94*a* extends to become closer to the outer side in the right-left direction toward the other first side in the bolt circumferential direction from a portion that is positioned closer to the second side in the bolt circumferential direction than the first side surface 101 is. In the locked state, the lock position restriction surfaces 74*a* and 94*a* of the drive cam 60 and the driven cam 61 face each other in the bolt circumferential direction. In the locked state, the lock position restriction surfaces 74*a* and 94*a* abut each other in the bolt circumferential direction so that the drive cam 60 is restricted from rotating toward the second side in the bolt circumferential direction with respect to the driven cam 61.

The top surface 94*b* linearly extends to the second side in the bolt circumferential direction from an outer end portion of the lock position restriction surface 94*a* in the right-left direction. The top surface 94*b* is positioned outside the pressing surface 103*b* in the right-left direction.

The release position restriction surface 94*c* is connected to an end portion of the top surface 94*b* that is on the second side in the bolt circumferential direction. The release position restriction surface 94*c* extends to become closer to the inner side in the right-left direction toward the second side in the bolt circumferential direction. The release position restriction surface 94c and the second side surface 104 of the follower projection 93b corresponding to the release position restriction surface 94c are positioned on the same plane in the bolt radial direction. In the unlocked state, the release position restriction surfaces 74c and 94c or the second side surfaces 84 and 104 abut each other in the bolt circumferential direction so that the drive cam 60 is restricted from rotating toward the first side in the bolt circumferential direction with respect to the driven cam 61.

As shown in FIG. 7, as seen in the bolt circumferential direction, the lock surfaces 83 and 103 are formed as inclined surfaces that extend to become closer to each other in the right-left direction from the outer side toward the inner side in the bolt radial direction. Specifically, the lock surface 83 of the drive cam 60 extends to become gradually closer to the inner side in the right-left direction from the outer side toward the inner side in the bolt radial direction. The lock surface 103 of the driven cam 61 extends to become gradually closer to the outer side in the right-left direction from the outer side toward the inner side in the bolt radial direction. Therefore, inner peripheral edges of the lock surfaces 83 and 103 constitute top portions (a first top portion and a second top portion) 83c and 103c that abut each other in the locked state. On the other hand, portions of the lock surfaces 83 and 103 that are positioned outside the top portions 83c and 103c in the bolt radial direction constitute outer clearance portions (a first clearance portion and a second clearance portion) 83d and 103d that are separated from each other in the locked state. The outer clearance portions 83d and 103d are formed as inclined surfaces that extend to become gradually farther from each other in the right-left direction toward the outer side in the bolt radial direction. The angles of the lock surfaces 83 and 103 (the outer clearance portions 83d and 103d) with respect to the bolt radial direction can be changed as appropriate.

As shown in FIG. 1, the first urging member 56 connects the locking piece 54d and the upper end portion of the first side plate portion 41 to each other. The first urging member 56 is, for example, a coil spring. The first urging member 56 urges the operation lever 54 toward the second side in the bolt circumferential direction via the locking piece 54d and urges the column unit 11 upward via the locking piece 54d.

The second urging member 57 connects a right end portion of the lock bolt 53 and the upper end portion of the second side plate portion 42 to each other. The second urging member 57 is, for example, a coil spring. The second urging member 57 urges the column unit 11 upward via the lock bolt 53.

As shown in FIG. 7, the cam urging member 58 is accommodated in the spring support portion 92a with the lock bolt 53 inserted thereinto. The cam urging member 58 is, for example, a coil spring. The cam urging member 58 urges the driven cam 61 outward in the right-left direction (toward the drive cam 60) with both end portions thereof in the right-left direction being in contact with the step surfaces 31c and 92b.

[Operation]

Figure 10:
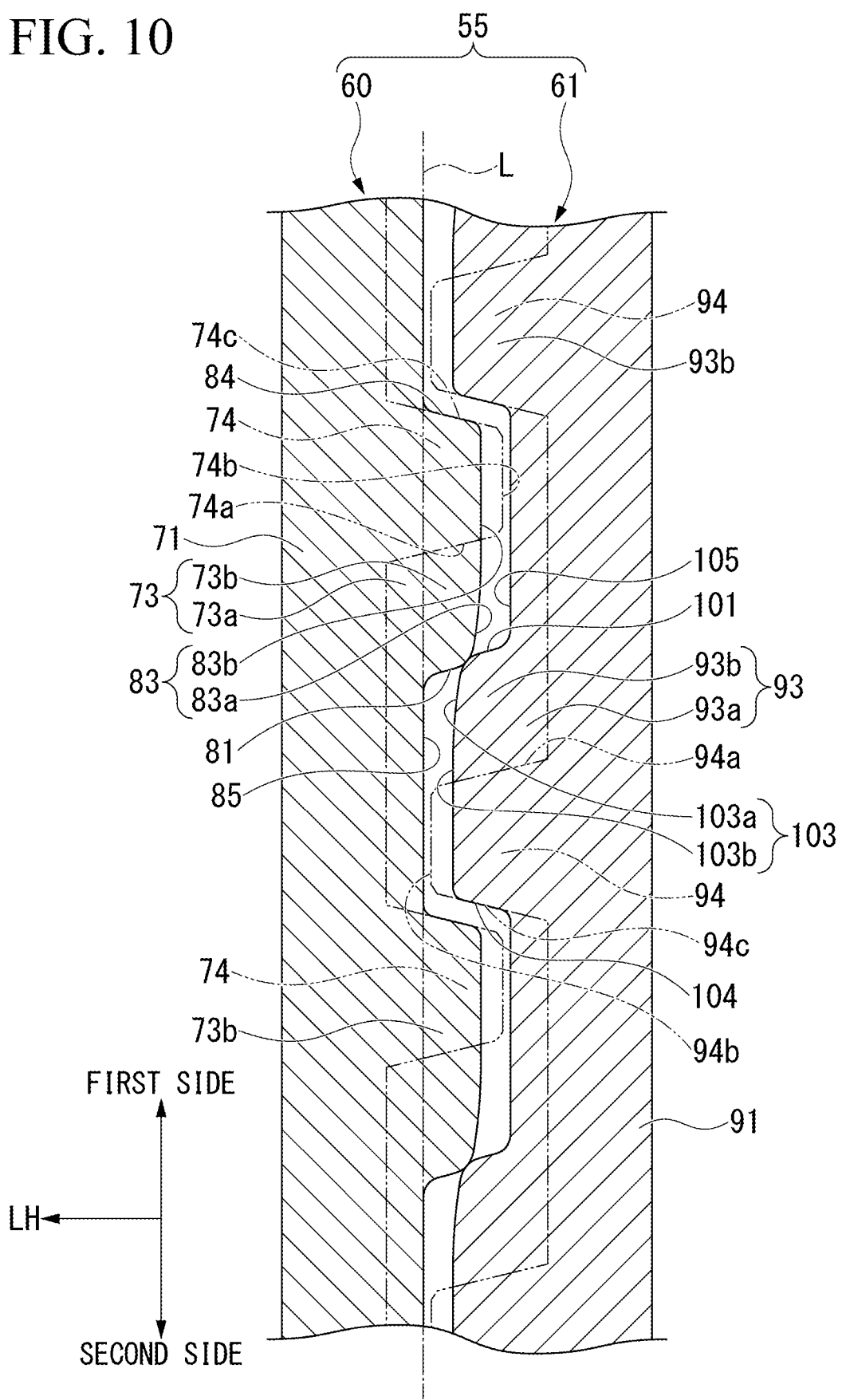
FIG. 10 is a view showing of the operation of a lock mechanism, and is a net corresponding to FIG. 9.
Figure 11:
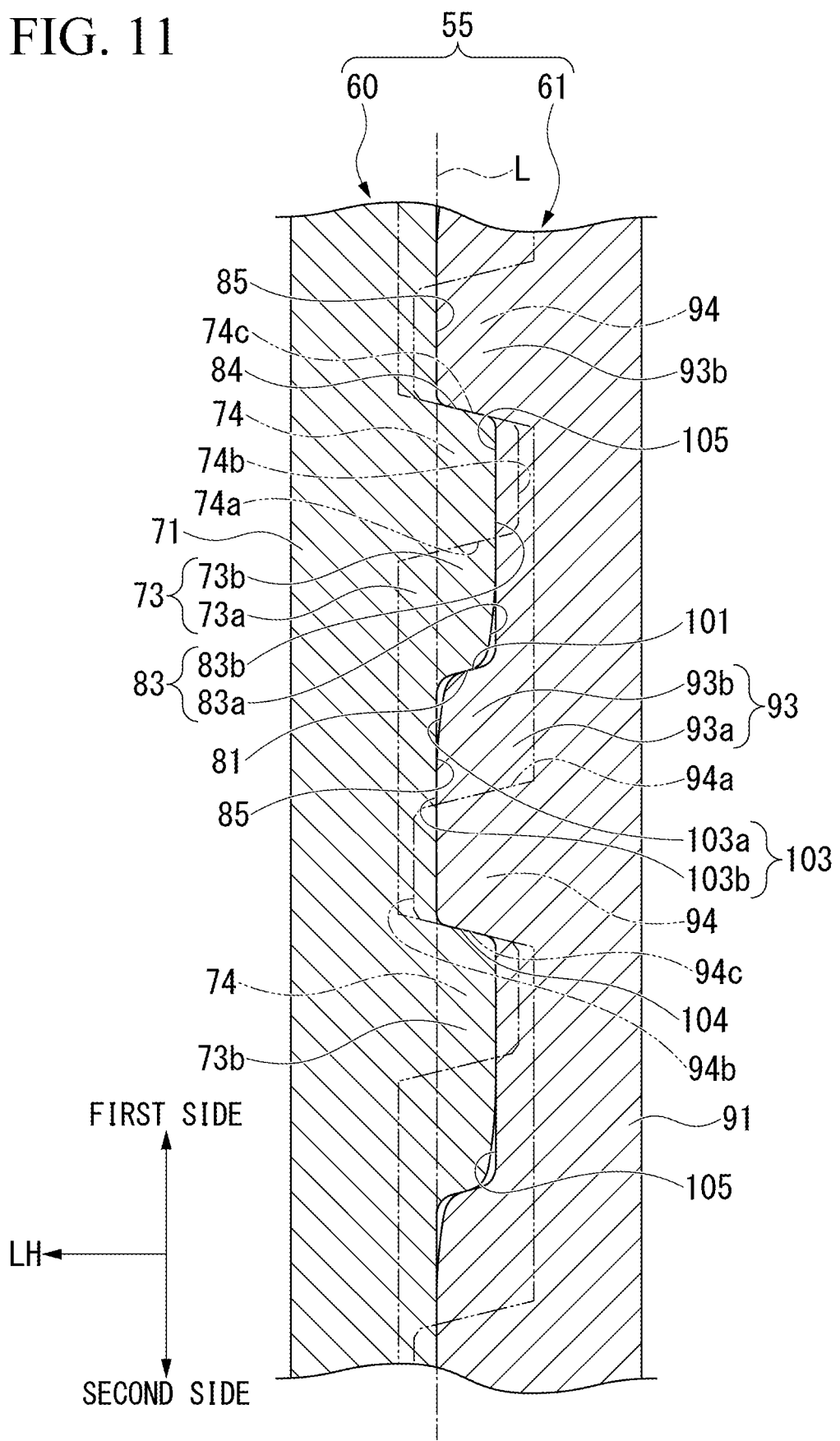
FIG. 11 is a view showing of the operation of the lock mechanism, and is a net corresponding to FIG. 9.
Figure 12:
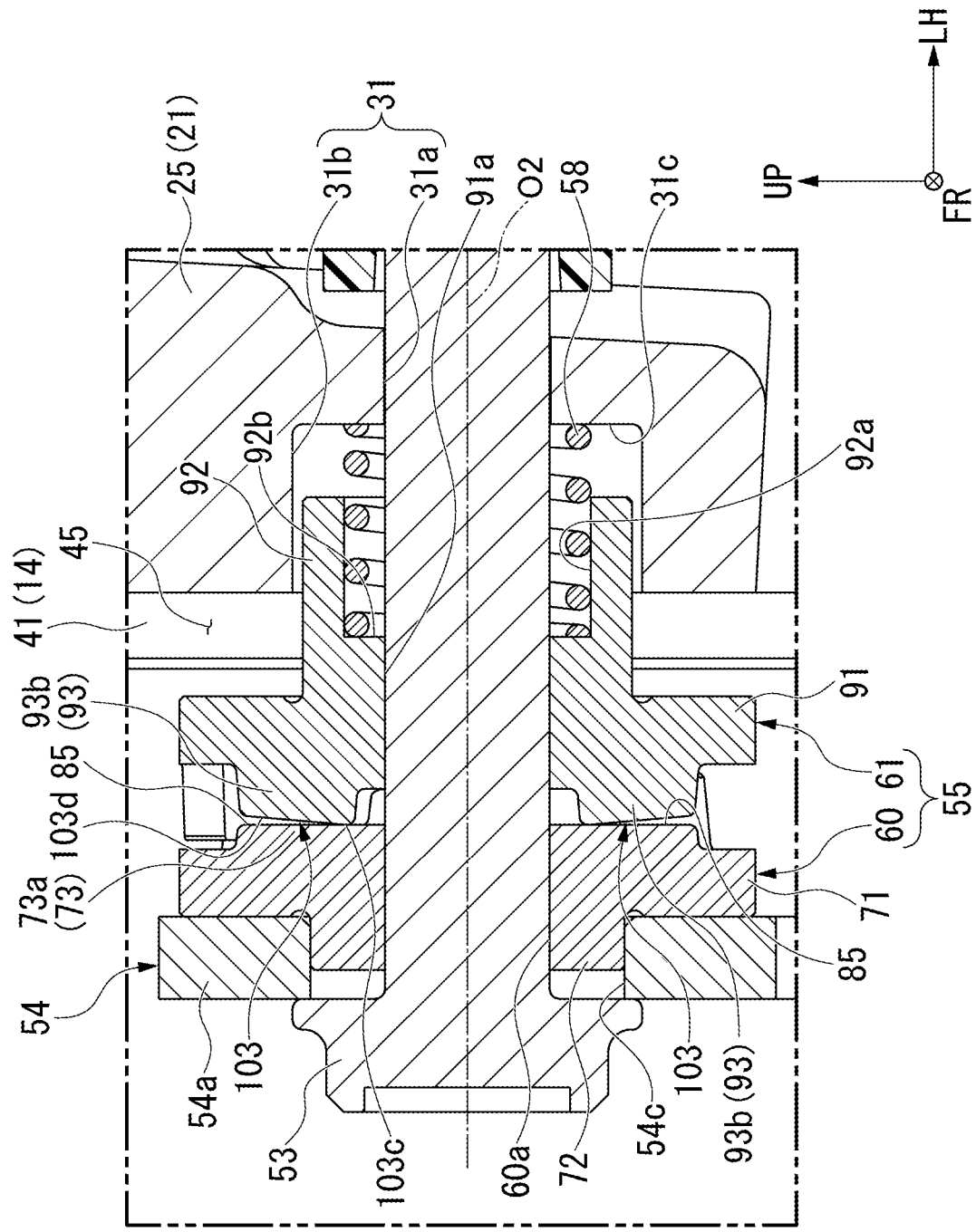
FIG. 12 is a view showing of the operation of the lock mechanism, and is a cross-sectional view corresponding to FIG. 7.

Next, the operation of the steering device 1 described above will be described. In the following description, a method of operating the lock mechanism 15 will be mainly described. FIGS. 10 to 12 are views showing the operation of the lock mechanism 15, FIGS. 10 and 11 are nets corresponding to FIG. 9, and FIG. 12 is a cross-sectional view corresponding to FIG. 7.

In the locked state shown in FIG. 9, the pressing surfaces 83b and 103b of the drive cam 60 and the driven cam 61 abut each other in the right-left direction so that the drive cam 60 and the driven cam 61 of the fastening cam 55 are restricted from moving to approach each other in the right-left direction. Particularly, regarding the pressing surface 83b and the pressing surface 103b, there is a gap between outer peripheral portions (the outer clearance portions 83d and 103d) of the pressing surface 83b and the pressing surface 103b in the right-left direction with the top portions 83c and 103c being in contact with each other. Since the lock position restriction surfaces 74a and 94a of the drive cam 60 and the driven cam 61 abut each other in the bolt circumferential direction, the drive cam 60 is restricted from rotating toward the second side in the bolt circumferential direction with respect to the driven cam 61.

In a case where the fastening cam 55 is to be caused to enter the unlocked state in this state, the operation lever 54 is rotated to the first side in the bolt circumferential direction. As the operation lever 54 is rotated, the drive cam 60 rotates toward the first side in the bolt circumferential direction with respect to the driven cam 61. Then, the driven cam 61 is moved to the outer side in the right-left direction by an urging force of the cam urging member 58 with the peripheral surfaces of the cam projections 73b of the drive cam 60 and the follower projections 93b of the driven cam 61 sliding on each other. Specifically, as shown in FIG. 10, the drive cam 60 is rotated to the first side in the bolt circumferential direction with respect to the driven cam 61 with the pressing surfaces 83b and 103b, the transition surfaces 83a and 103a, and the first side surfaces 81 and 101 sliding on each other in order. In addition, as the drive cam 60 is rotated to the first side in the bolt circumferential direction with respect to the driven cam 61, the driven cam 61 is displaced to the outer side in the right-left direction by the urging force of the cam urging member 58. As a result, as the drive cam 60 is rotated to the first side in the bolt circumferential direction, the thickness of the fastening cam 55 is gradually decreased (the drive base 71 and the driven base 91 approach each other).

When the thickness of the fastening cam 55 is decreased, the fastening portions 25 and 26 are separated from each other together with the side plate portions 41 and 42, so that the diameter of the holding tubular portion 24 is increased. Thereafter, as shown in FIGS. 11 and 12, the cam projection 73b reaches a position between the follower projections 93b of the driven cam 61 that are adjacent to each other in the bolt circumferential direction, so that the thickness of the fastening cam 55 is minimized. In this state, the inner column 22 clamped by the holding tubular portion 24 is released and the telescopic operation and the tilting operation are allowed (the unlocked state is entered). In the unlocked state, the lock surface 83 of the drive cam 60 faces the release surface 105 of the driven cam 61 in the right-left direction and the pressing surface 103b of the driven cam 61 faces the release surface 85 of the drive cam 60 in the right-left direction. In the unlocked state, the release position restriction surface 74c of the drive cam 60 and the release position restriction surface 94c of the driven cam 61 abut each other in the bolt circumferential direction, so that the drive cam 60 is restricted from rotating toward the first side in the bolt circumferential direction with respect to the driven cam 61.

It is possible to perform the telescopic operation by moving the steering wheel 2 forward and backward in the unlocked state. For example, when the steering wheel 2 is pressed forward, the steering wheel 2 is moved forward with respect to the outer column 21 together with the inner column 22 and the steering shaft 12. Meanwhile, when the steering wheel 2 is pulled rearward, the steering wheel 2 is moved rearward with respect to the outer column 21 together with the inner column 22 and the steering shaft 12. Accordingly, it is possible to adjust the position of the steering wheel 2 in the front-rear direction to any position. As shown in FIG. 4, when the column unit 11 is at the maximum contraction position P1, the lock bolt 53 abuts onto the front telescopic stoppers 36b from behind via the collar 59 and thus the inner column 22 and the like are restricted from moving forward. Meanwhile, when the column unit 11 is at the maximum expansion position P2, the lock bolt 53 abuts onto the rear telescopic stoppers 36c from ahead via the collar 59 and thus the inner column 22 and the like are restricted from moving rearward.

It is possible to perform the tilting operation by moving the steering wheel 2 upward and downward in the unlocked state. For example, in a case where the steering wheel 2 is to be adjusted to face an upper side, the steering wheel 2 is pressed upward. Then, the lock bolt 53 moves upward in the tilt guide holes 45 and thus the steering wheel 2 moves upward in a direction around the axis O3 together with the column unit 11 and the steering shaft 12. Meanwhile, in a case where the steering wheel 2 is to be adjusted to face a lower side, the steering wheel 2 is pulled downward. Then, the steering wheel 2 moves downward along the tilt guide holes 45 in a direction around the axis O3 together with the column unit 11 and the steering shaft 12. Accordingly, it is possible to adjust the angle of the steering wheel 2 to any position.

After the telescopic operation or the tilting operation is finished, the fastening cam 55 is returned to the locked state. Specifically, the operation lever 54 is rotated toward the second side in the bolt circumferential direction. As the operation lever 54 is rotated, the drive cam 60 rotates toward the second side in the bolt circumferential direction with respect to the driven cam 61. Then, as shown in FIGS. 9 and 10, the driven cam 61 is moved to the inner side in the right-left direction against the urging force of the cam urging member 58 with the peripheral surfaces of the cam projections 73b and the follower projections 93b sliding on each other. Specifically, the drive cam 60 is rotated to the other first side in the bolt circumferential direction with respect to the driven cam 61 with the first side surfaces 81 and 101, the transition surfaces 83a and 103a, and the pressing surfaces 83b and 103b sliding on each other in order. In addition, as the drive cam 60 is rotated to the second side in the bolt circumferential direction with respect to the driven cam 61, the driven cam 61 is displaced to the inner side in the right-left direction against the urging force of the cam urging member 58. As a result, as the drive cam 60 is rotated to the second side in the bolt circumferential direction, the thickness of the fastening cam 55 is gradually increased (the drive base 71 and the driven base 91 are separated from each other).

As shown in FIG. 7, while the lock surface 83 (the transition surface 83a and the pressing surface 83b) of the drive cam 60 is sliding on the lock surface 103 (the transition surface 103a and the pressing surface 103b) of the driven cam 61, the lock surfaces 83 and 103 slide on each other via the top portions 83c and 103c. That is, regarding the drive cam 60 and the driven cam 61, the top portions 83c and 103c positioned at inner peripheral portions slide on each other at all times in a state where the outer clearance portions 83d and 103d positioned at the outer peripheral portions are separated from each other.

When the thickness of the fastening cam 55 is increased, the fastening portions 25 and 26 approach each other together with the side plate portions 41 and 42, so that the diameter of the holding tubular portion 24 is decreased. Thereafter, the pressing surface 83b of the drive cam 60 and the pressing surface 103b of the driven cam 61 abut each other in the right-left direction and the thickness of the fastening cam 55 is maximized. In this state, the inner column 22 is clamped by the holding tubular portion 24 and the telescopic operation and the tilting operation are restricted (the locked state is entered). In the locked state, the lock position restriction surface 74a of the drive cam 60 and the lock position restriction surface 94a of the driven cam 61 abut each other in the bolt circumferential direction, so that the drive cam 60 is restricted from rotating toward the second side in the bolt circumferential direction with respect to the driven cam 61.

As described above, in the steering device 1 of the present embodiment, the lock surface 83 of the drive cam 60 (the cam portion 73) is configured to include the top portion 83c that comes into contact with the lock surface 103 of the driven cam 61 (the cam follower portion 93) and the outer clearance portion 83d that extends to become farther from the lock surface 103 in the right-left direction from the top portion 83c toward the outer side in the bolt radial direction.

According to this configuration, the top portions 83c and 103c positioned at the inner peripheral portions can slide on each other at all times in a state where the outer clearance portions 83d and 103d positioned at the outer peripheral portions are separated from each other when the drive cam 60 and the driven cam 61 rotate relative to each other. Accordingly, it is possible to set the position of contact on the lock surfaces 83 and 103 to a position on the inner side in the bolt radial direction and thus it is possible to reduce torque around the axis O2 at the time of an operation of rotating the operation lever 54. Accordingly, it is possible to reduce operation torque at the time of rotation of the operation lever 54 and thus excellent operability can be exhibited. It is possible to set a relatively large radius of curvature for the lock surfaces 83 and 103 in comparison with a configuration in which the radius of curvature of a cam portion is made small for the purpose of setting the position of contact on the lock surfaces 83 and 103 to a position on the inner side in the bolt radial direction. Accordingly, a small component force along a rotation direction of the drive cam 60, which is a portion of a load that acts between the lock surfaces 83 and 103 along a normal direction of the lock surfaces 83 and 103, can be secured and a large component force along the right-left direction can be secured. Since the component force along the rotation direction of the drive cam 60 is made small, it is possible to reduce a frictional force generated when the drive cam 60 and the driven cam 61 rotate relative to each other and to achieve a further improvement in operability. Since the component force along the right-left direction is made large, it is easy to secure an axial force that presses the side plate portion 41 in the right-left direction via the cam follower portion 93. As a result, it is easy to secure a desired fastening force in the locked state.

Furthermore, it is possible to reduce manufacturing variability in comparison with a configuration in which the radius of curvature of a cam portion is made small. Therefore, it is possible to reduce variability in the position of contact on the lock surfaces 83 and 103 for each product and to provide the steering device 1 with a high quality.

In the present embodiment, the top portions 83c and 103c are formed at inner end portions of the lock surfaces 83 and 103 in the bolt radial direction.

According to this configuration, the position of contact on the lock surfaces 83 and 103 can be set to an innermost position in the bolt radial direction and thus it is possible to more reliably reduce the torque around the axis O2 at the time of the operation of rotating the operation lever 54.

In the present embodiment, the outer clearance portions 83*d* and 103*d* are formed as inclined surfaces that become gradually farther from each other in the right-left direction from the top portions 83*c* and 103*c* toward the outer side in the bolt radial direction.

According to this configuration, it is easy to secure the strengths of the cam projection 73*b* and the follower projection 93*b* in comparison with a configuration in which the outer clearance portions 83*d* and 103*d* are formed as curved surfaces or formed in stepped shapes, for example.

In the present embodiment, the top portions 83*c* and 103*c* are formed on the lock surfaces 83 and 103 of the drive cam 60 and the driven cam 61.

According to this configuration, it is easy to set the position of contact on the lock surfaces 83 and 103. Therefore, it is possible to reduce variability in the position of contact on the lock surfaces 83 and 103 for each product and to provide the steering device 1 with excellent reliability.

In the present embodiment, the drive cam 60 includes the restriction portions 74 that bulge in the right-left direction from the drive base 71 at a portion of the drive base 71 that is positioned outside the cam portion 73 in the bolt radial direction and the driven cam 61 includes the restriction portions 94 that bulge in the right-left direction from the driven base 91 at a portion of the driven base 91 that is positioned outside the cam follower portion 93 in the bolt radial direction.

According to this configuration, it is possible to reduce the outer diameters of the drive cam 60 and the driven cam 61 in comparison with a case where the restriction portions 74 and the cam projections 73*b* are disposed on the same circumference and the restriction portions 94 and the follower projections 93*b* are disposed on the same circumference. In addition, since the cam projections 73*b* and the follower projections 93*b* are disposed inside the restriction portions 74 and 94 in the bolt radial direction, it is easy to reduce the torque around the axis O2.

In the present embodiment, the cam urging member 58 that urges the cam follower portion 93 toward the cam portion 73 is disposed between the driven cam 61 and the first side plate portion 41.

According to this configuration, it is easy to secure a load in the right-left direction that acts between the drive cam 60 and the driven cam 61. Therefore, it is easy to secure a frictional force (a static frictional force) acting in the bolt circumferential direction between the drive cam 60 and the driven cam 61 particularly when the fastening cam 55 is in the unlocked state. Accordingly, even if the lock bolt 53 (the operation lever 54) is urged to the second side in the bolt circumferential direction by an urging force or the like of the first urging member 56 when the fastening cam 55 is in the unlocked state, rotation of the fastening cam 55 toward the locked state can be suppressed. As a result, in the unlocked state, an axial force acting because of the fastening cam 55 can be reduced, and the telescopic operation or the tilting operation can be performed smoothly.

Although preferable examples of the present disclosure have been described above, the present disclosure is not limited to the examples. Configurations may be added, omitted, replaced, or modified without departing from the gist of the present disclosure. The present disclosure is not limited by the above description, but only by the appended claims.

For example, in the above-described embodiment, a configuration in which the axis O1 intersects the shaft axial direction has been described. However, the present disclosure is not limited thereto. The axis O1 may coincide with the shaft axial direction of the vehicle.

In the above-described embodiment, a configuration in which the top portions 83*c* and 103*c* and the outer clearance portions 83*d* and 103*d* are formed at the lock surfaces 83 and 103 of the drive cam 60 and the driven cam 61 has been described. However, the present disclosure is not limited thereto. It is sufficient that a top portion (the first top portion) and an outer clearance portion (the first clearance portion) are formed at a portion (the first portion) of any one of the cam projections 73*b* and the follower projection 93*b*.

Figure 13:
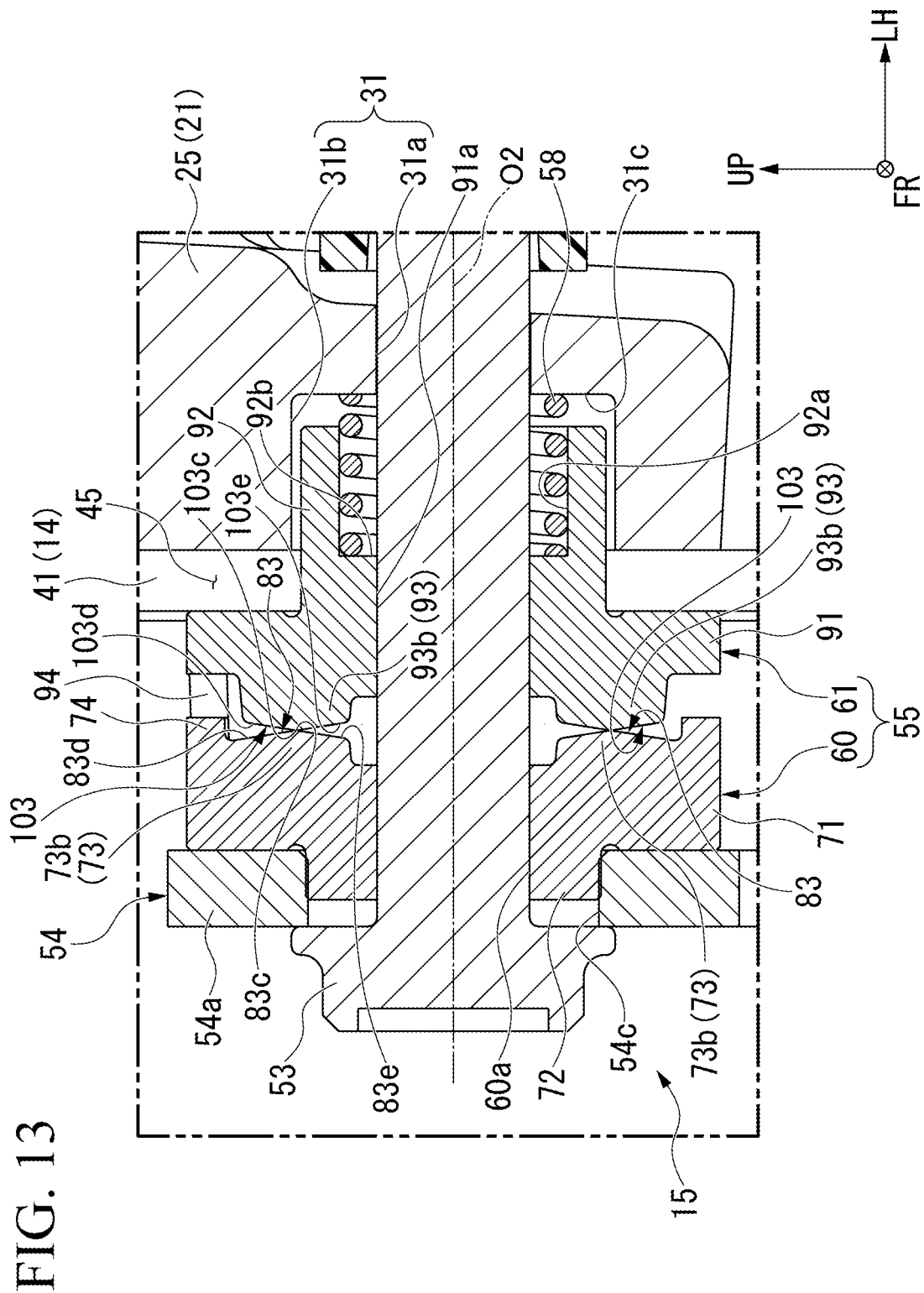
FIG. 13 is a cross-sectional view according to a modification example, which corresponds to FIG. 7.

In the above-described embodiment, a configuration in which the top portions 83*c* and 103*c* are formed at the inner end portions of the lock surfaces 83 and 103 in the bolt radial direction has been described. However, the present disclosure is not limited thereto. For example, as shown in FIG. 13, the top portions 83*c* and 103*c* may be provided on central portions of the lock surfaces 83 and 103 in the bolt radial direction. In this case, the outer clearance portions 83*d* and 103*d* are formed at portions of the lock surfaces 83 and 103 that are positioned outside the top portions 83*c* and 103*c* in the bolt radial direction. Inner clearance portions 83*e* and 103*e* are formed at portions that are positioned inside the top portions 83*c* and 103*c* in the bolt radial direction. As described above, the positions of the top portions 83*c* and 103*c* of the lock surfaces 83 and 103 in the bolt radial direction can be appropriately adjusted as long as the top portions 83*c* and 103*c* are positioned inside the outer clearance portions 83*d* and 103*d*.

Figure 14:
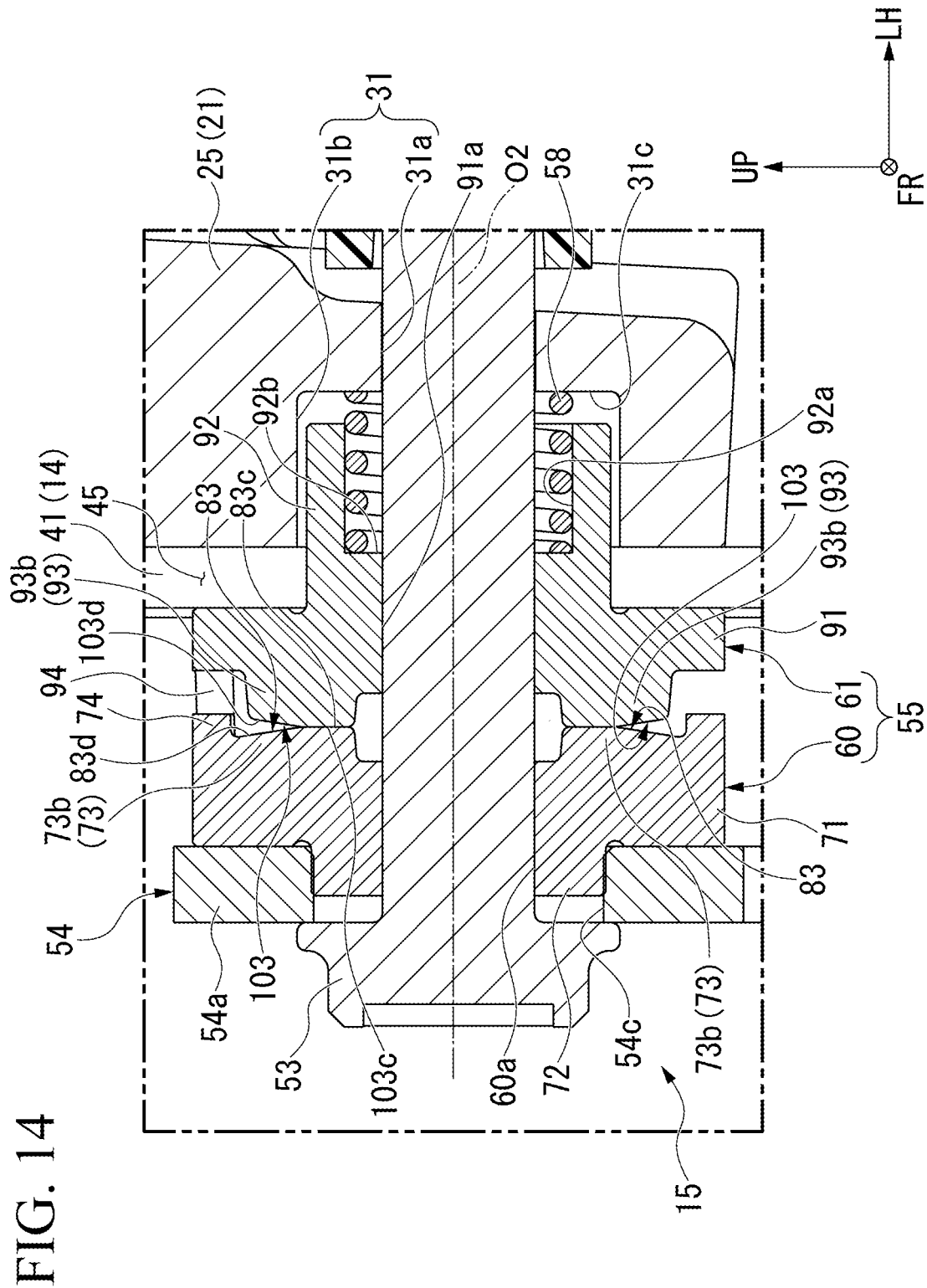
FIG. 14 is a cross-sectional view according to a modification example, which corresponds to FIG. 7.

The ranges of the top portions 83*c* and 103*c* in the bolt radial direction can be appropriately changed. For example, as shown in FIG. 14, the top portions 83*c* and 103*c* may not be formed to have linear shapes along the bolt circumferential direction and may be formed to have planar shapes. In this case, the lock surfaces 83 and 103 are formed in a trapezoidal shape as seen in the bolt circumferential direction.

Figure 15:
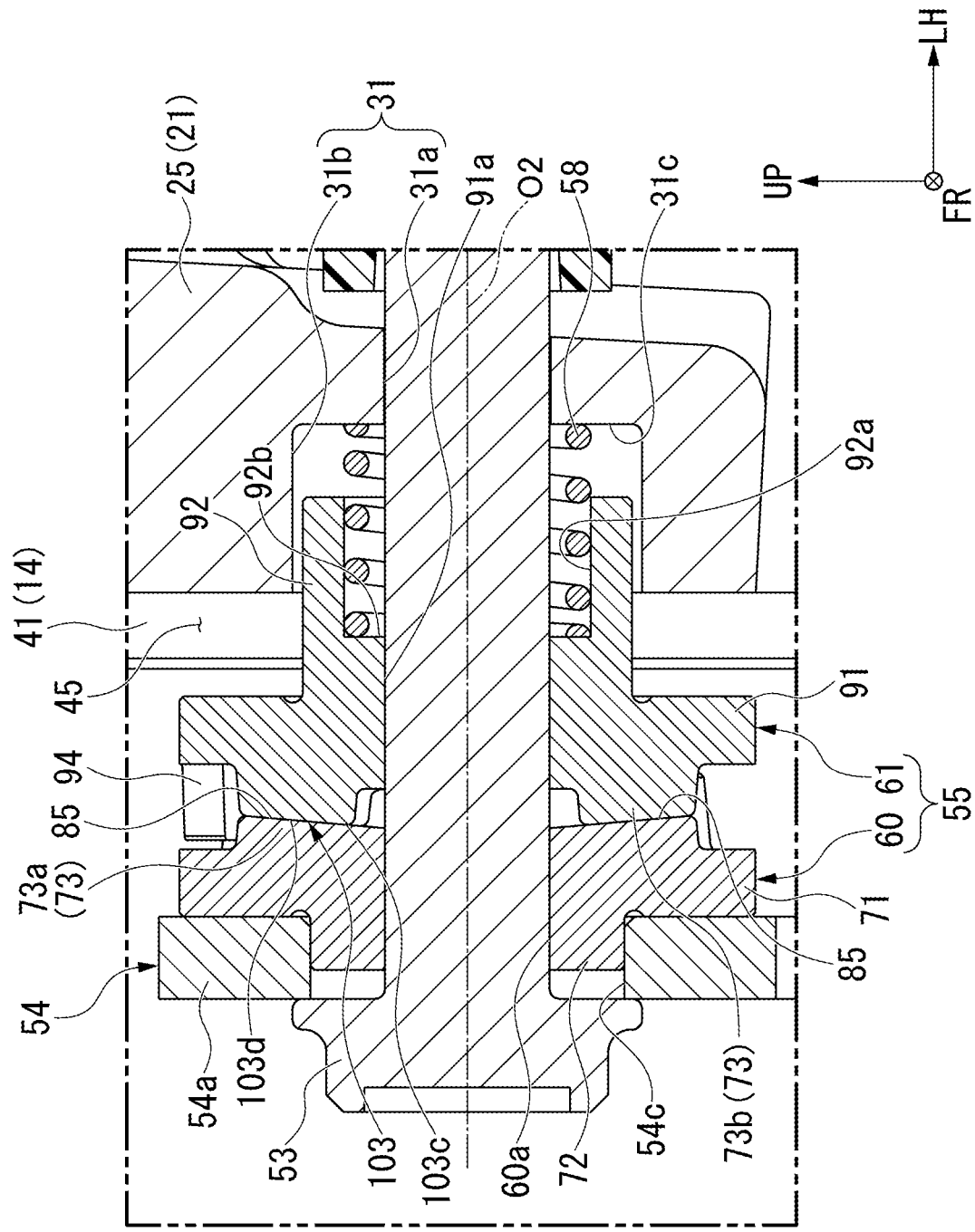
FIG. 15 is a cross-sectional view according to a modification example, which corresponds to FIG. 12.

In the above-described embodiment, a configuration in which the release surfaces 85 and 105 are formed as flat surfaces has been described. However, the present disclosure is not limited thereto. For example, as shown in FIG. 15, the release surfaces 85 and 105 may be formed in imitation of the shapes of the lock surfaces 83 and 103 (for example, may be formed as inclined surfaces that become farther from each other in the right-left direction toward the inner side in the bolt radial direction). In this case, since the release surfaces 85 and 105 and the lock surfaces 83 and 103 are likely to come into surface contact with each other at an unlocking position, it is possible to reduce a surface pressure acting between the lock surfaces 83 and 103 and the release surfaces 85 and 105. As a result, an axial force in the unlocked state can be made small.

In the above-described embodiment, a configuration in which the restriction portions 74 and 94 are provided outside the cam portion 73 and the cam follower portion 93 in the bolt radial direction has been described. However, the present disclosure is not limited thereto. The cam portion 73 and the restriction portion 74 may be provided on the same circumference and the cam follower portion 93 and the restriction portion 94 may be provided on the same circumference.

In the above-described embodiment, a configuration in which a pair of the side plate portions 41 and 42 are clamped by both end portions of the lock bolt 53 from both sides in the right-left direction has been described. However, the present disclosure is not limited thereto. The pair of side plate portions 41 and 42 may be clamped from both sides in the right-left direction by a rod-shaped member other than the lock bolt 53.

In the above-described embodiment, a configuration in which the top portions 83c and 103c are provided over the entire lock surfaces 83 and 103 in the bolt circumferential direction (over the transition surfaces 83a and 103a and the pressing surfaces 83b and 103b) has been described. However, the present disclosure is not limited thereto. A configuration in which the top portions 83c and 103c are partially provided on the lock surfaces 83 and 103 in the bolt circumferential direction (for example, on the pressing surfaces 83b and 103b only) may also be adopted. A configuration in which not only the lock surfaces 83 and 103 but also the first side surfaces 81 and 101 (the entire cam projection 73b or the entire follower projection 93b) include top portions may also be adopted.

In the above-described embodiment, a configuration in which the outer clearance portions 83d and 103d are formed as inclined surfaces that extend to become gradually farther from each other in the right-left direction toward the outer side in the bolt radial direction has been described. However, the present disclosure is not limited thereto. The outer clearance portions 83d and 103d may be curved surfaces, step surfaces, or the like, as long as the outer clearance portions 83d and 103d extend to become farther from each other in the right-left direction from the top portions 83c and 103c toward the outer side in the bolt radial direction.

While preferred embodiments of the invention have been described and illustrated above, it should be understood that these are exemplary of the invention and are not to be considered as limiting. Additions, omissions, substitutions, and other modifications can be made without departing from the scope of the invention. Accordingly, the invention is not to be considered as being limited by the foregoing description and is only limited by the scope of the appended claims.

EXPLANATION OF REFERENCES

1: Steering device
11: Column unit
12: Steering shaft
14: Rear bracket (bracket)
15: Lock mechanism
41: First side plate portion (side plate portion)
42: Second side plate portion (side plate portion)
45: Tilt guide hole
53: Lock bolt (rod)
58: Cam urging member (urging member)
60: Drive cam
61: Driven cam
71: Drive base
73: Cam portion (first portion, second portion)
74: Restriction portion (first restriction portion)
81: First side surface (ride-over surface)
83c: Top portion (first top portion, second top portion)
83d: Outer clearance portion (first clearance portion, second clearance portion)
91: Driven base
93: Cam follower portion (second portion, first portion)
94: Restriction portion (second restriction portion)
101: First side surface (ride-over surface)
103c: Top portion (second top portion, first top portion)
103d: Outer clearance portion (second clearance portion, first clearance portion)
O1: Axis (first axis)
O2: Axis (second axis)

What is claimed is:

1. A steering device comprising:
a column unit configured to support a steering shaft such that the steering shaft is rotatable around a first axis extending along a front-rear direction;
a bracket configured to support the column unit to be movable upward and downward along tilt guide holes and including a pair of side plate portions in which the tilt guide holes extending in a vertical direction are formed, the side plate portions being provided on both sides with respect to the column unit in a right-left direction; and
a lock mechanism configured to switch between a locked state in which the paired side plate portions are caused to approach each other in the right-left direction so that the column unit is restricted from moving upward and downward with respect to the bracket and an unlocked state in which the paired side plate portions are separated from each other in the right-left direction so that the column unit is allowed to move upward and downward with respect to the bracket,
wherein the lock mechanism includes
a rod that penetrates the column unit and the tilt guide holes in the right-left direction and that is supported by the column unit so as to be rotatable in a circumferential direction around a second axis extending along the right-left direction,
a drive cam that includes a drive base and a cam portion bulging in the right-left direction from the drive base and that integrally rotates with the rod, and
a driven cam that includes a driven base and a cam follower portion bulging in the right-left direction from the driven base and sliding on the cam portion as the rod rotates,
the lock mechanism causes the paired side plate portions to approach each other in the right-left direction with the drive base and the driven base being separated from each other in the right-left direction as the cam portion slides on the cam follower portion toward a first side in the circumferential direction and causes the paired side plate portions to be separated from each other in the right-left direction with the drive base and the driven base approaching from each other in the right-left direction as the cam portion slides on the cam follower portion toward a second side in the circumferential direction,
a first portion from among the cam portion and the cam follower portion includes
a first top portion that comes into contact with a second portion from among the cam portion and the cam follower portion, and
a first clearance portion that extends to become farther from the second portion in the right-left direction from the first top portion toward an outer side in a radial direction intersecting the second axis,
the second portion includes
a second top portion that comes into contact with the first top portion, and
a second clearance portion that extends to become farther from the first portion in the right-left direction from the second top portion toward the outer side in the radial direction.

2. The steering device according to claim 1,
wherein the first top portion is formed at an inner end portion of the first portion in the radial direction.

3. The steering device according to claim 2,
wherein the first clearance portion is formed as an inclined surface that extends to become farther from the second portion in the right-left direction from the first top portion toward the outer side in the radial direction.

4. The steering device according to claim 1,
wherein the first clearance portion is formed as an inclined surface that extends to become farther from the second portion in the right-left direction from the first top portion toward the outer side in the radial direction.

5. The A steering device comprising:
a column unit configured to support a steering shaft such that the steering shaft is rotatable around a first axis extending along a front-rear direction;
a bracket configured to support the column unit to be movable upward and downward along tilt guide holes and including a pair of side plate portions in which the tilt guide holes extending in a vertical direction are formed, the side plate portions being provided on both sides with respect to the column unit in a right-left direction; and
a lock mechanism configured to switch between a locked state in which the paired side plate portions are caused to approach each other in the right-left direction so that the column unit is restricted from moving upward and downward with respect to the bracket and an unlocked state in which the paired side plate portions are separated from each other in the right-left direction so that the column unit is allowed to move upward and downward with respect to the bracket,
wherein the lock mechanism includes
  a rod that penetrates the column unit and the tilt guide holes in the right-left direction and that is supported by the column unit so as to be rotatable in a circumferential direction around a second axis extending along the right-left direction,
  a drive cam that includes a drive base and a cam portion bulging in the right-left direction from the drive base and that integrally rotates with the rod, and
  a driven cam that includes a driven base and a cam follower portion bulging in the right-left direction from the driven base and sliding on the cam portion as the rod rotates,
the lock mechanism causes the paired side plate portions to approach each other in the right-left direction with the drive base and the driven base being separated from each other in the right-left direction as the cam portion slides on the cam follower portion toward a first side in the circumferential direction and causes the paired side plate portions to be separated from each other in the right-left direction with the drive base and the driven base approaching from each other in the right-left direction as the cam portion slides on the cam follower portion toward a second side in the circumferential direction,
a first portion from among the cam portion and the cam follower portion includes
  a first top portion that comes into contact with a second portion from among the cam portion and the cam follower portion, and
  a first clearance portion that extends to become farther from the second portion in the right-left direction from the first top portion toward an outer side in a radial direction intersecting the second axis,
the drive cam includes a first restriction portion that bulges in the right-left direction from the drive base at a portion of the drive base that is positioned outside the cam portion in the radial direction,
the driven cam includes a second restriction portion that bulges in the right-left direction from the driven base at a portion of the driven base that is positioned outside the cam follower portion in the radial direction, and
in the locked state, the first restriction portion and the second restriction portion abut each other in the circumferential direction so that the cam portion is restricted from rotating toward the first side in the circumferential direction with respect to the cam follower portion.

6. The steering device according to claim 5,
wherein the first top portion is formed at an inner end portion of the first portion in the radial direction.

7. The steering device according to claim 5,
wherein the first clearance portion is formed as an inclined surface that extends to become farther from the second portion in the right-left direction from the first top portion toward the outer side in the radial direction.

8. A steering device comprising:
a column unit configured to support a steering shaft such that the steering shaft is rotatable around a first axis extending along a front-rear direction;
a bracket configured to support the column unit to be movable upward and downward along tilt guide holes and including a pair of side plate portions in which the tilt guide holes extending in a vertical direction are formed, the side plate portions being provided on both sides with respect to the column unit in a right-left direction; and
a lock mechanism configured to switch between a locked state in which the paired side plate portions are caused to approach each other in the right-left direction so that the column unit is restricted from moving upward and downward with respect to the bracket and an unlocked state in which the paired side plate portions are separated from each other in the right-left direction so that the column unit is allowed to move upward and downward with respect to the bracket,
wherein the lock mechanism includes
  a rod that penetrates the column unit and the tilt guide holes in the right-left direction and that is supported by the column unit so as to be rotatable in a circumferential direction around a second axis extending along the right-left direction,
  a drive cam that includes a drive base and a cam portion bulging in the right-left direction from the drive base and that integrally rotates with the rod, and
  a driven cam that includes a driven base and a cam follower portion bulging in the right-left direction from the driven base and sliding on the cam portion as the rod rotates,
the lock mechanism causes the paired side plate portions to approach each other in the right-left direction with the drive base and the driven base being separated from each other in the right-left direction as the cam portion slides on the cam follower portion toward a first side in the circumferential direction and causes the paired side plate portions to be separated from each other in the right-left direction with the drive base and the driven base approaching from each other in the right-left direction as the cam portion slides on the cam follower portion toward a second side in the circumferential direction, a first portion from among the cam portion and the cam follower portion includes
- a first top portion that comes into contact with a second portion from among the cam portion and the cam follower portion, and
- a first clearance portion that extends to become farther from the second portion in the right-left direction from the first top portion toward an outer side in a radial direction intersecting the second axis, and an urging member configured to urge the cam follower portion toward the cam portion is disposed between the driven cam and the side plate portion.

9. The steering device according to claim 8,
wherein the first top portion is formed at an inner end portion of the first portion in the radial direction.

10. The steering device according to claim 8,
wherein the first clearance portion is formed as an inclined surface that extends to become farther from the second portion in the right-left direction from the first top portion toward the outer side in the radial direction.

\* \* \* \* \*